United States Patent [19]

Seto

[11] Patent Number: 5,555,181
[45] Date of Patent: Sep. 10, 1996

[54] METHOD OF POSITIONING IMAGE FRAME AND PHOTOGRAPHIC FILM CARRIER

[75] Inventor: Yasuhiro Seto, Kanagawa, Japan

[73] Assignee: Fuji Photo Film Co., Ltd., Kanagawa, Japan

[21] Appl. No.: 888,984

[22] Filed: May 27, 1992

[30] Foreign Application Priority Data

May 28, 1991 [JP] Japan .................................. 3-123857

[51] Int. Cl.$^6$ .................................................. G03B 27/52
[52] U.S. Cl. ................................................ 355/41; 355/75
[58] Field of Search ....................... 355/40, 41; 250/559, 250/560, 561

[56] References Cited

U.S. PATENT DOCUMENTS

| | | | |
|---|---|---|---|
| 3,627,411 | 10/1971 | Nagel | 355/45 |
| 3,699,349 | 10/1972 | Paulus et al. | 250/219 |
| 3,721,495 | 3/1973 | Tanaka | 355/41 |
| 4,167,678 | 9/1979 | Mischo et al. | 250/559 |
| 4,727,399 | 2/1988 | Matsumoto | 355/41 |

FOREIGN PATENT DOCUMENTS

| | | |
|---|---|---|
| 3538822 | 5/1986 | Germany . |
| 52-2429 | 1/1977 | Japan . |
| 53-134422 | 11/1978 | Japan . |
| 54-103032 | 8/1979 | Japan . |
| 58-53537 | 12/1983 | Japan . |
| 1130129 | 9/1989 | Japan . |
| 3-11329 | 1/1991 | Japan . |
| 3011330 | 1/1991 | Japan . |

OTHER PUBLICATIONS

(English Abstract for 3-11329) Patent Abstracts of Japan (translated), Kokai No. 3-11329, published Jan. 18, 1991.
(English Abstract for 52-2429) Patent Abstracts of Japan (translated), Kokai No. 52-2429, published Jan. 10, 1977.
(English Abstract for 54-103032) Patent Abstracts of Japan (translated), Kokai No. 54-103032, published Aug. 14, 1979.
(English Abstract for 53-134422) Patent Abstracts of Japan (translated), Kokai No. 53-134422, published Nov. 24, 1978.
European Search Report, Feb. 16, 1993.

*Primary Examiner*—D. Rutledge
*Attorney, Agent, or Firm*—Sughrue, Mion, Zinn Macpeak & Seas

[57] ABSTRACT

A method is provided for positioning an image frame recorded on a photographic film at a predetermined position for printing process. In the method, an image frame edge is detected depending on a quantity of transmitted light passing through the photographic film during carrying. If there is a faulty image frame having an undetectable frame edge, a film carrying amount is determined depending on a recording tendency of normal image frames preceding the faulty image frame. Therefore, it is possible to compensate, for example, a feed pitch error by a camera, and to position the image frame accurately. Further, it can be established whether the image frame is a standard size image frame or a panoramic size image frame depending on the quantity of transmitted light. Thus, the printing process can be consecutively performed by positioning only one of the two type image frames so that an operation efficiency can be improved.

21 Claims, 17 Drawing Sheets

METHOD OF POSITIONING IMAGE FRAME AND PHOTOGRAPHIC FILM CARRIER

BACKGROUND OF THE INVENTION

1. Field of the Invention

The present invention relates to a method of positioning an image frame for detecting an image frame edge on a photographic film based on a quantity of transmitted light passing through the photographic film which is carried on a guide path, and positioning the detected image frame edge at a predetermined position.

2. Description of the Related Art

A photoprinter is provided with a negative carrier at a printing position for, in order positioning image frames of a negative film in order at the printing position after development of the film. The negative carrier comprises a base and a cover body which can open and close with respect to the base. The base has a negative film guide path provided with a printing opening corresponding to an image frame. The guide path has driving rollers at positions corresponding to the vicinities of both the transverse edges of the negative film. The driving rollers are rotated by a driving force of a pulse motor. The cover body is provided with idle rollers paired with the driving rollers to hold the negative film between the driving rollers and idle rollers. Thus, these paired rollers are allowed to hold and carry the negative film along the guide path when the cover body is closed and the negative film is inserted into the negative carrier from one side thereof.

A detecting apparatus for detecting an image frame edge is mounted upstream the printing opening of the guide path. The detecting apparatus, as disclosed in Japanese Patent Application Laid-Open No. 3-11329, is provided with a cold-cathode tube or a halogen lamp at the rear side of the guide path, and a slit hole formed in the guide path. In the detecting apparatus, each image frame of the negative film on the guide path is irradiated with a light emitted from the cold-cathode tube or halogen lamp.

The cover body is provided with a light receiving sensor corresponding to the slit hole so that light transmitted through the negative film can be received by the sensor. Transmission density of the negative film can be calculated based on quantity of received light detected by the light receiving sensor. Generally, a base portion of the negative film has a low transmission density while the negative film has a high transmission density within the range of the image frame. It is possible to compare a difference between the transmission density of the base portion and that of the image frame with the predetermined transmission density to detect a boundary between the image frame and the base portion, i.e., the image frame edge. The image frame edge allows the respective image frames of the negative film to be positioned at the printing position.

Therefore, it is possible to position each image frame of the negative film at the printing position automatically and accurately even if the pitches of the respective image frames recorded on the negative film are fluctuated depending on feeding errors in photographing by a camera. Thus, the feeding error due to a quantitative feeding can be eliminated. In addition, the negative carrier itself can be simply constructed because it is not necessary to detect a notch provided for each image frame.

In such a control for positioning, a front edge of each image frame generally serves as a reference edge when it is normally spaced from the preceding image frame. If abnormally spaced, it is detected whether or not the back edge of the image frame is normally spaced from the preceding image frame. If normally spaced, the back edge can be used as the reference edge. If neither front nor back edges are normally spaced, the negative film is quantitatively fed on the basis of a state where the preceding image frame is positioned.

However, when the quantitative feeding is carried out, it is not always ensured that an appropriate relation is provided between a position of the image frame to be positioned and that of the preceding image frame. Therefore, the positioning may not be accurately performed. Also, repetition of the quantitative feeding causes an accumulated error so that the positioning point may be further deviated.

In recent years, it has been desired to provide a camera for photographing on a so-called panoramic size image frame as well as so-called standard size image frames such as a full-size image frame and a half-size image frame. A printed photographic paper on which the panoramic size image frame has been printed is longer in the side corresponding to the longitudinal direction at the negative film than a photographic paper on which the full-size image frame has been printed. The panoramic size image frame has a shorter transverse length of the negative film than that of the standard size image frame, and is defined in a narrower form than the full-size image frame. Accordingly, a negative film may include both the standard size image frame and the panoramic size image frame.

However, the size of the image frames can not be selected by the conventional negative carrier. Thus, the size should be selected depending on an operator's visual check.

In the conventional negative carrier, a negative mask suitable for each size of the image frame is employed, and mounted on the printing opening. In order to process the negative film including image frames in both sizes, the negative mask is switched according to the size of each image frame to be detected and positioned so that image frames can be printed in the order of the image frames recorded on the negative film.

However, in the conventional printing method, the negative mask should be frequently switched depending on a condition including each size image frame to reduce the process efficiency. Further, an operation to sort the printed photographic papers according to their sizes requires more time period and results in a poor efficiency.

SUMMARY OF THE INVENTION

In view of the facts set forth above, it is an object of the present invention to provide a method of positioning an image frame in which a faulty image frame can be accurately positioned even if a faulty image frame edge can not be detected by a detecting apparatus and the faulty image frame is quantitatively fed.

It is a further object of the invention to provide a method of positioning an image frame and a photographic film carrier for automatically discriminating each size of the image frames, and collating the discriminated result with the image frame mask on a printing opening to select the only image frames having the same size and position them at a printing position consecutively.

To accomplish the objects set forth above, according to a first aspect of the present invention, a method of positioning the image frame recorded on the photographic film at a predetermined position, said method comprising the steps of: detecting an image frame edge depending on a quantity of transmitted light passing through the photographic film while the photographic film is being carried; determining a film carrying amount, wherein for a normal image frame the ledge of which has been detected in said detecting step, the film carrying amount is based on the detected image frame edge, and for a faulty image frame the edge of which has been undetected in said detecting step, the film carrying amount is based on a recording tendency, said recording tendency being obtained based on the image frame edges of the normal image frames preceding said faulty image frame; and a positioning step of positioning the image frame at the predetermined position by carrying the photographic film by the film carrying amount determined in the determining step.

According to the first aspect of the invention as constructed above, if there is the faulty image frame having an undetectable image frame edge, the film is not quantitatively fed by the predetermined, reference amount. The film is carried by a film carrying amount which is determined depending on the recording tendency of the normal image frame preceding the faulty image frame. In image frames of the photographic film photographed by the same camera, when the image frame deviates from an image frame pitch of the specification of the camera, the deviating amount may be frequently constant. The feed amount is determined depending on the recording tendency of the normal image frame so that the deviating amount can be obtained. As a result, the positioning can be accurately performed.

It is assumed that the film feeding amount is the sum of an average of carrying directional lengths of the normal image frames preceding the faulty image frame and an average of intervals between the normal image frames. In this case, a more accurate grasp can be made for the recording tendency of the image frames recorded on the photographic film under process. As a result, it is possible to position the image frame more accurately.

On the other hand, it is impossible to grasp the recording tendency of the image frame recorded on the photographic film, for example, in case there is not a normal image frame preceding the faulty image frame or in case the faulty image frame is placed on a leading edge of the film. In such a case, the photographic film is carried by the predetermined reference amount to avoid occurrence of error. Hence, complicated action for the error becomes unnecessary.

According to a second aspect of the present invention, a method of positioning an image frame at a predetermined position to print each image frame recorded on a photographic film on a photographic paper, said method comprising the steps of: measuring a quantity of transmitted light passing through the photographic film while the photographic film is being carried; detecting an image frame edge and establishing an image frame size in a transverse direction of the photographic film, based on the quantity of transmitted light measured in the measuring step; and positioning the image frame at the predetermined position by carrying the photographic film by a film carrying amount determined based on the image frame edge detected in the detecting and establishing step when the image frame size selected in the detecting and establishing step conforms to a predetermined size. The image frame size may be any one of the standard size and the panoramic size.

According to the second aspect of the invention as constructed above, when the photographic film includes both the standard size image frame and the panoramic size image frame, it is possible to discriminate a film size automatically and selectively position the only image frame having the same size as the predetermined size. Therefore, the only one of the respective size image frames can be consecutively positioned and printed. After processing the one size image frame completely, the other size image frame is positioned and consecutively printed. Thus, it is not necessary to switch a negative mask frequently so that an operation efficiency can be improved.

According to a third aspect of the present invention, a photographic film carrier used in conjunction with a photoprinter for printing image frames consecutively recorded on a photographic film on a photographic paper, and used for carrying the photographic film to position each image frame at a printing position in order, the photographic film carrier comprising: a base having a printing opening for exposing light provided at the printing position, and having a guide path for guiding the photographic film; a switching means for enabling a mask of a standard size image frame and that for a panoramic size image frame to be switched over from one to another; a measuring means disposed upstream of the printing opening for measuring a quantity of transmitted light passing through the photographic film carried on the guide path, said measuring means comprising a plurality of sensors disposed along the transverse direction of the photographic film, and at least one of said sensors disposed within the range of the standard size image frame in the photographic film transverse direction and outside the range of the panoramic size image frame in the photographic film transverse direction; an image frame detecting means for detecting an image frame edge depending on the quantity of transmitted light measured by the measuring means; an establishing means for selecting the size of the image frame depending on the quantity of transmitted light measured by the at least one of the sensors; and a positioning means for positioning the image frame at the printing position depending on the image frame edge detected by the image frame detecting means when the size of said image frame, selected by said selecting means, that of the image frame mask on the printing opening.

According to the third aspect of the invention, the switching means allows any one of the standard size image frame mask to be positioned and the panoramic size image frame mask at the printing opening. The quantity of transmitted light passing through the photographic film is measured by the measuring means upstream the printing opening. The image frame edge is detected depending on the quantity of transmitted light, and is positioned. At least one of the sensors constituting the measuring means is disposed within the range of the standard size image frame in the photographic film transverse direction and outside the range of the panoramic size image frame in the photographic film transverse direction. Hence, when the quantity of transmitted light detected by the sensor is substantially identical with a quantity of transmitted light corresponding to a base of the photographic film, the image frame can be defined as a panoramic size image frame. At the time, if the image frame mask for the panoramic size image frame is selected on the printing opening by the switching means, the panoramic size image frame is positioned at the printing position and is printed. Conversely, if the image frame mask for the standard size image frame is selected, the panoramic image frame is skipped and the printing process is passed. In such a way, only the image frames having the same size consecutively printed so that the operation efficiency can be improved. The skipped image frames may be positioned again in order after switching the image frame mask, and may be printed.

As discussed above, it is possible to discriminate the image frame size while the image frame edge is detected, and to consecutively print the only image frame having the same size as the image frame mask on the printing opening. Therefore, the operation efficiency can be improved in the printing process for the photographic film including both the standard size image frame and the panoramic size image frame.

DESCRIPTION OF THE PREFERRED EMBODIMENTS

Figure 1:
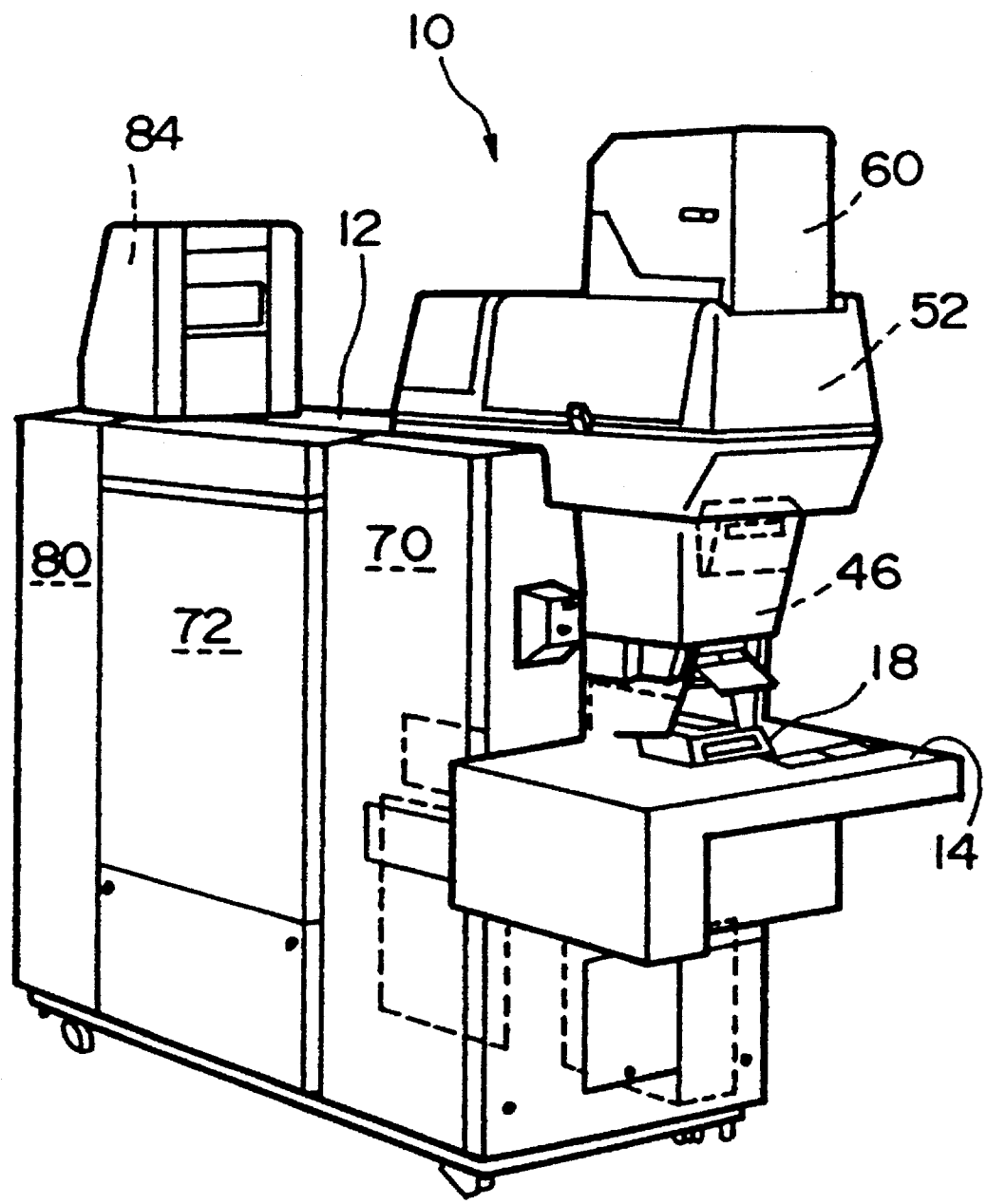
FIG. 1 is a perspective view illustrating an external construction of a printer-processor.
Figure 2:
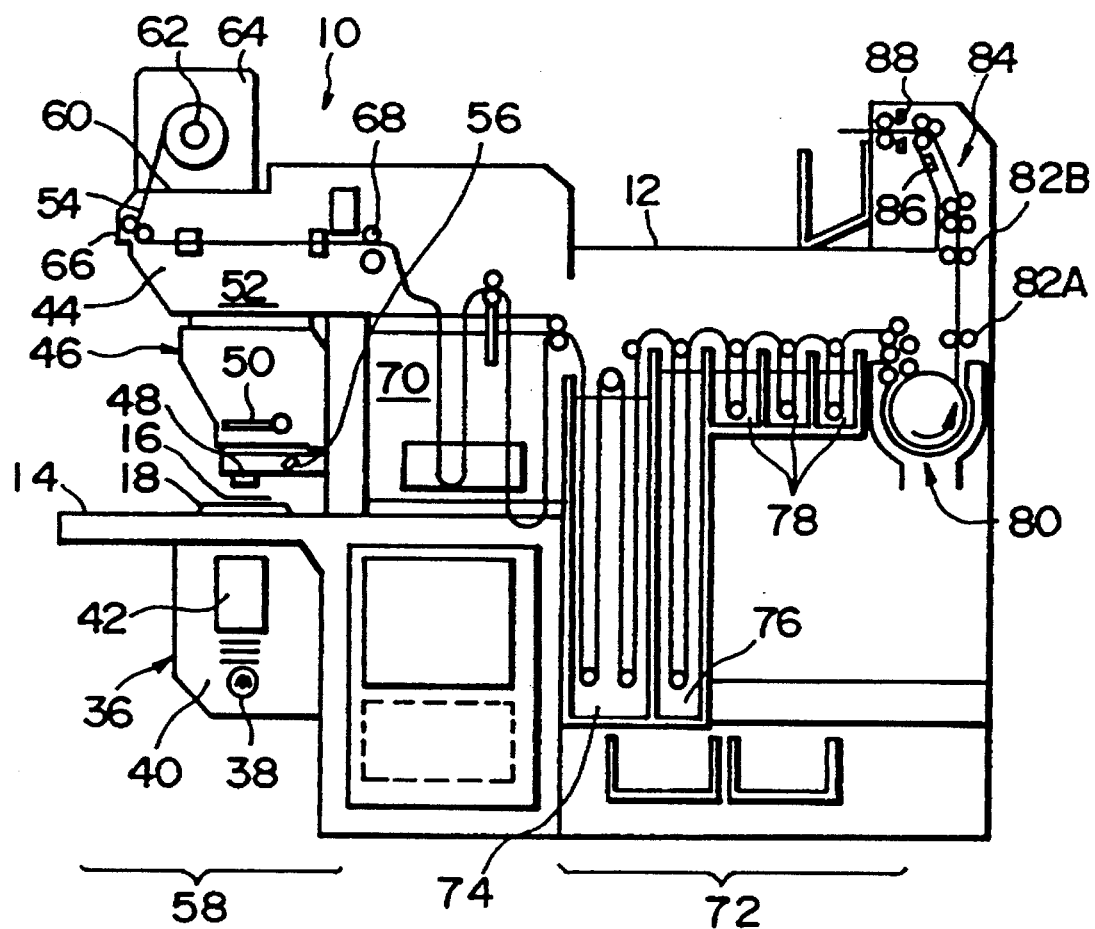
FIG. 2 is a schematic diagram illustrating an internal construction of the printer-processor.

FIGS. 1 and 2 illustrate a printer-processor 10 serving as a photoprinter, to which a method and a control unit, and a photographic film carrier according to the present invention are applied. Referring now to the accompanying drawings, overall construction of the printer-processor 10 will be described.

The printer-processor 10 is externally covered with a casing 12.

The printer-processor 10 is provided with a working table 14 projecting from the casing 12 to the left-hand side in FIG. 2. A negative carrier 18 in which a negative film 16 is set is mounted on the upper surface of the working table 14. A detailed construction of the negative carrier 18 will be discussed in the following.

A light source portion 36 is disposed under the working table 14. The light source portion 36 has a light source 38. Light emitted from the light source 38 passes through a filter portion 40 and diffusion cylinder 42, and reaches the negative film 16 set on the negative carrier 18. The filter portion 40 comprises three filters C, M, and Y. Each filter is adapted to move into or out of an optical axis of the light.

An optical system 46 is mounted on an arm 44 projecting from the printer-processor 10. The optical system 46 comprises a lens 48 and a shutter 50, and is disposed across the optical axis of the light. The light transmitted through the negative film 16 passes through the lens 48 and the shutter 50 to direct an image of the negative film 16 on a photographic paper 54 set in an exposure chamber 52.

Further, the optical system 46 is provided with a densitometer 56 such as CCD for measuring a density of the negative film 16. The densitometer 56 is connected to a controller 162 (see FIG. 3). An exposure compensation during exposure is set according to data measured by the densitometer 56 and keyed data by an operator.

An exposure portion 58 comprises the light source portion 36, the optical system 46, and the exposure chamber 52, to perform a printing process.

A mounting portion 60 is provided on the upper side of the arm 44. Mounted detachably on the mounting portion 60 is a paper magazine 64 containing a photographic paper 54 wound around a reel 62 in a layer fashion.

A pair of rollers 66 are disposed in the vicinity of the mounting portion 60 to hold the photographic paper 54 therebetween to carry to the exposure chamber 52. Also, a pair of rollers 68 are disposed in the vicinity of the exposure chamber 52. Similarly, the rollers 68 hold the photographic paper 54 on which an image of the negative film 16 is recorded in the exposure chamber 52, to carry to a reservoir portion 70 adjacent to the exposure chamber 52.

The reservoir portion 70 has the printed, or exposed, photographic paper 54 in store to cancel difference in operating time between the exposure portion 58 and a processor portion 72. The exposure portion 58 performs a printing process while a processor portion 72 performs a developing, a fixation, and a washing in water.

The photographic paper 54 ejected from the reservoir portion 70 is carried to a color development portion 74 of the processor portion 72 adjacent to the reservoir portion 70. The photographic paper 54 is immersed in developer for development in the color development portion 74. The developed photographic paper 54 is carried to a bleach-fix portion 76 adjacent to the color development portion 74. The photographic paper 54 is immersed in fixer for fixation in the bleach-fix portion 76. The fixed photographic paper 54 is carried to a rinse portion 78 adjacent to the bleach-fix portion 76. The photographic paper 54 is immersed in washing water in the rinse portion 78 for washing in water.

The washed photographic paper 54 is carried to a drying portion 80 adjacent to the rinse portion 78. The drying portion 80 winds the photographic paper 54 around a roller to expose to hot-air for drying.

A pair of rollers 82A hold the photographic paper 54 therebetween, and ejects the dried photographic paper 54 from the drying portion 80 at regular velocity. A pair of rollers 82B are disposed on the upper side of the rollers 82A. The rollers 82B intermittently rotates corresponding to operation of a cutter portion 84 which is disposed downstream the drying portion 80. The cutter portion 84 comprises a cut mark sensor 86 for detecting a cut mark provided for the photographic paper 54, and a cutter 88 for cutting the photographic paper 54. The cutter portion 84 cuts the photographic paper 54 at every image frame, and ejects the image frames outside the casing 12 of the printer-processor 10.

Figure 3:
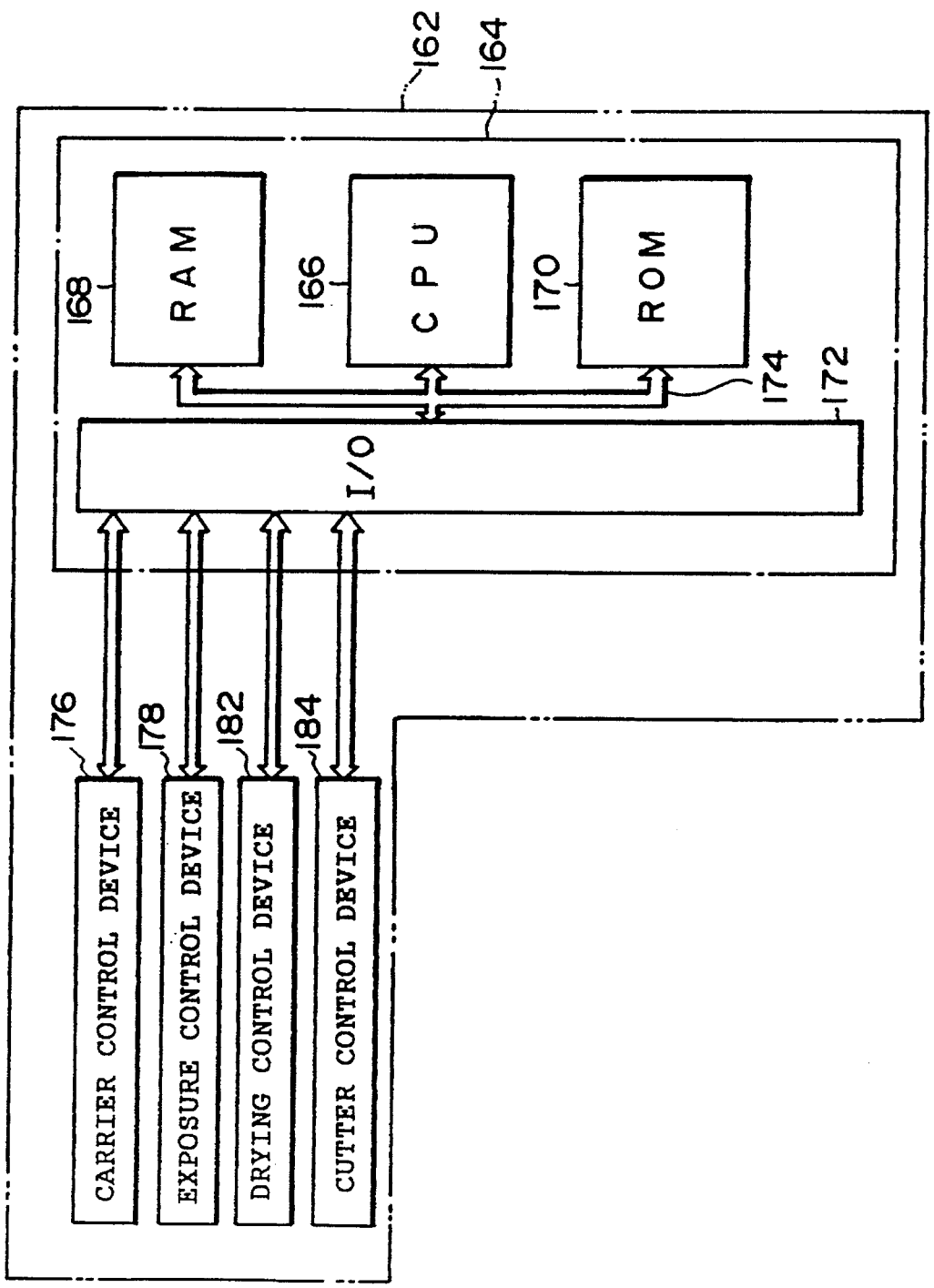
FIG. 3 is a block diagram of a controller of the printer-processor.

As shown in FIG. 3, each control in the devices described later is performed by the controller 162. The controller 162 includes a microcomputer 164. The microcomputer 164 comprises CPU 166, RAM 168, ROM 170, an input-output port 172, and a bus 174 such as a data bus or a control bus. The CPU 166, the RAM 168, the ROM 170 and the input-output port 172 are connected by the bus 174.

The controller 162 is connected with a carrier control device 176 which controls a carrying system for the negative film 16 and photographic paper 54 in the printer-processor 10. The controller 162 is connected with an exposure control device 178. The exposure control device 178 controls an exposure system which serves to, for example, turn on the light source 38, move the respective filters of the filter portion 40 in and out of the optical axis, feed a frame in the negative carrier 18, and open and close the shutter 50 in the exposure portion 58, The controller 162 is connected with a drying control device 182 which controls driving conditions for a fan and a heater in the drying portion 80. Further, the controller 162 is connected with a cutter control device 184 which controls to detect the cut mark by the cut mark sensor 86 of the cutter portion 84 downstream the drying portion 80, and cut the photographic paper 54 by the cutter 88.

Figure 4:
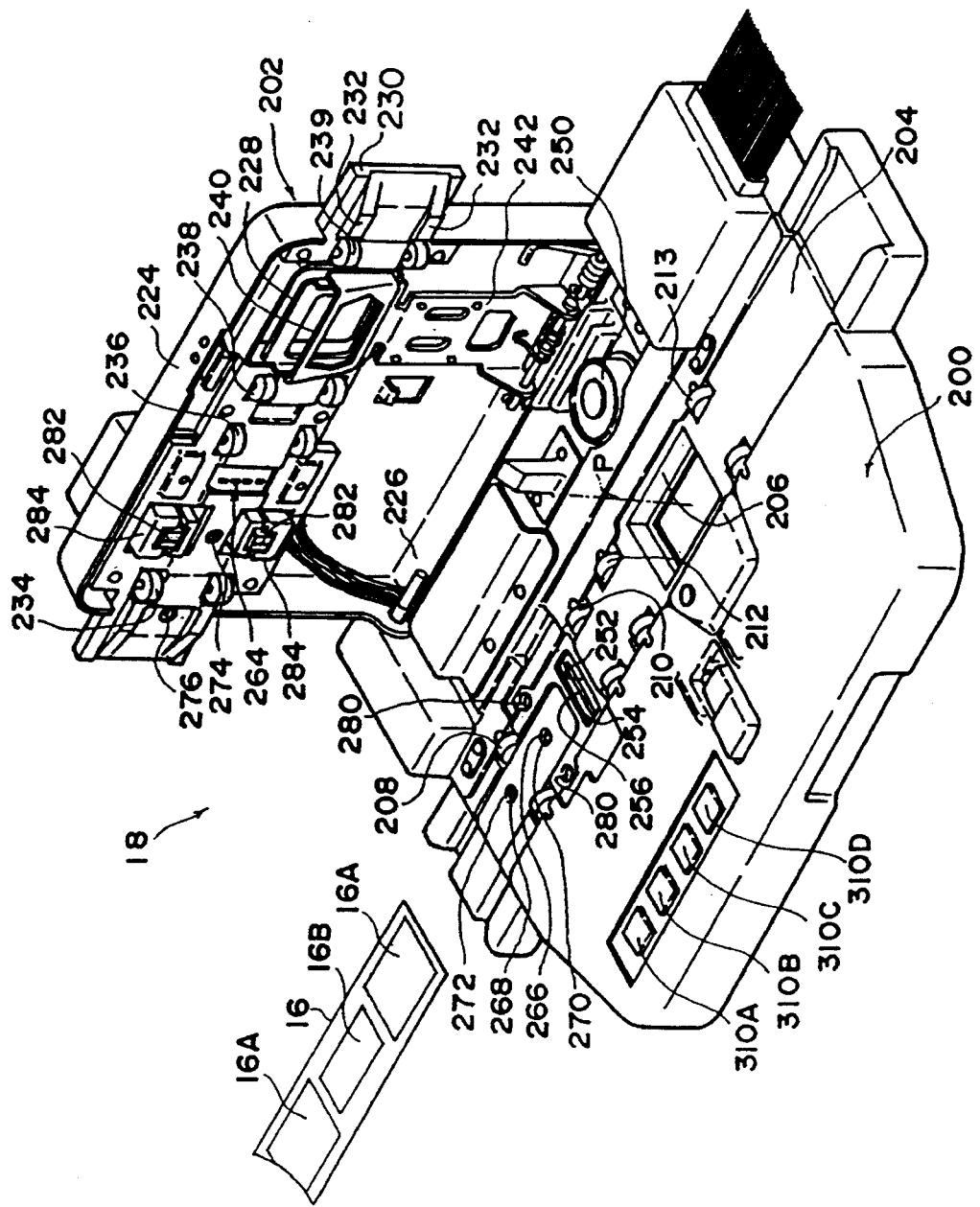
FIG. 4 is a perspective view illustrating an external construction of a negative carrier.

FIG. 4 illustrates a preferred embodiment of the negative carrier 18 according to the invention. The negative carrier 18 essentially comprises a pedestal 200 serving as a base, and an opening/closing cover 202 serving as a cover body.

The pedestal 200 has a negative film carrying path 204 serving as a guide path. The negative film carrying path 204 is provided with a printing opening 206 at a longitudinal intermediate portion thereof. The printing opening 206 serves as an exposure opening for light emitted from the light source 38 which is provided for the printer-processor 10.

Figure 5:
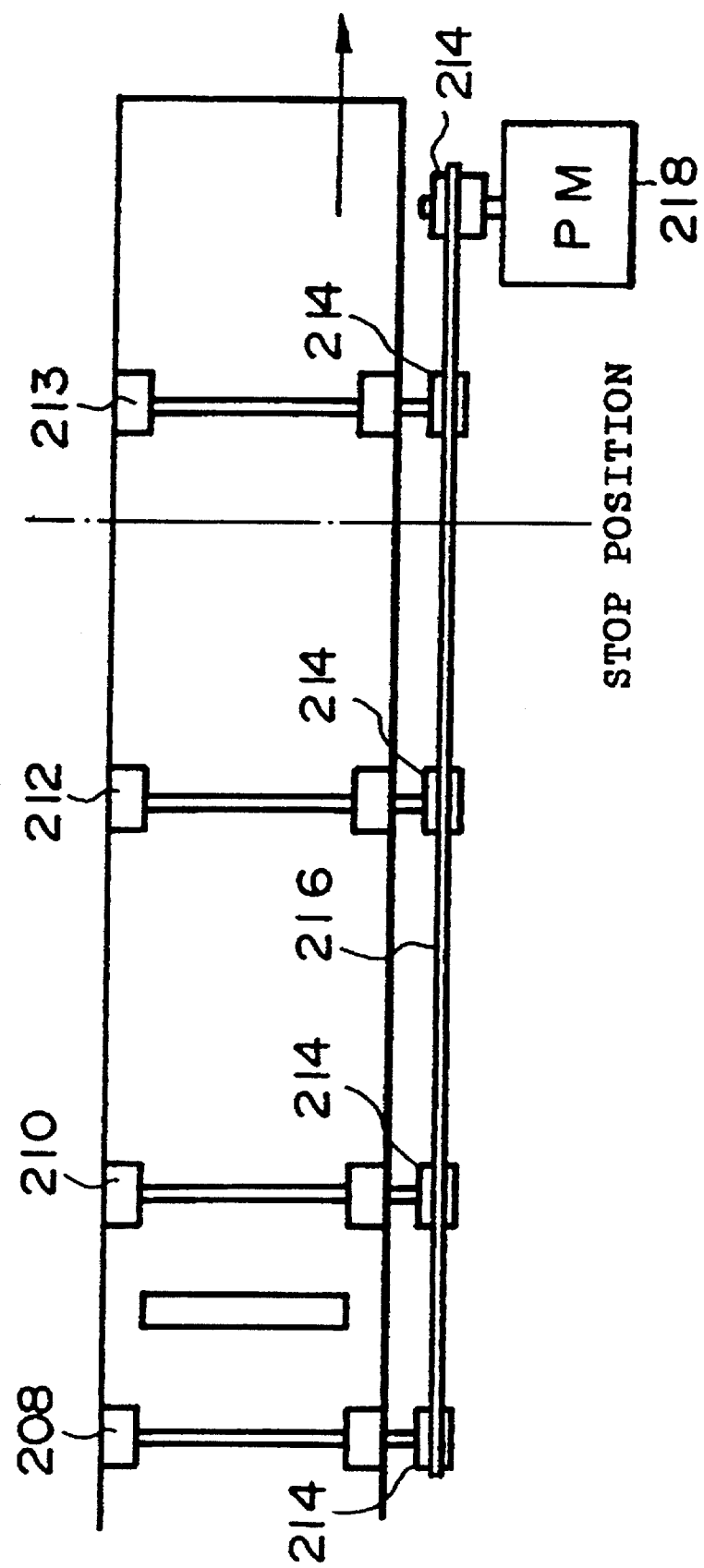
FIG. 5 is a perspective view illustrating a carrier system of the negative carrier.
Figure 6:
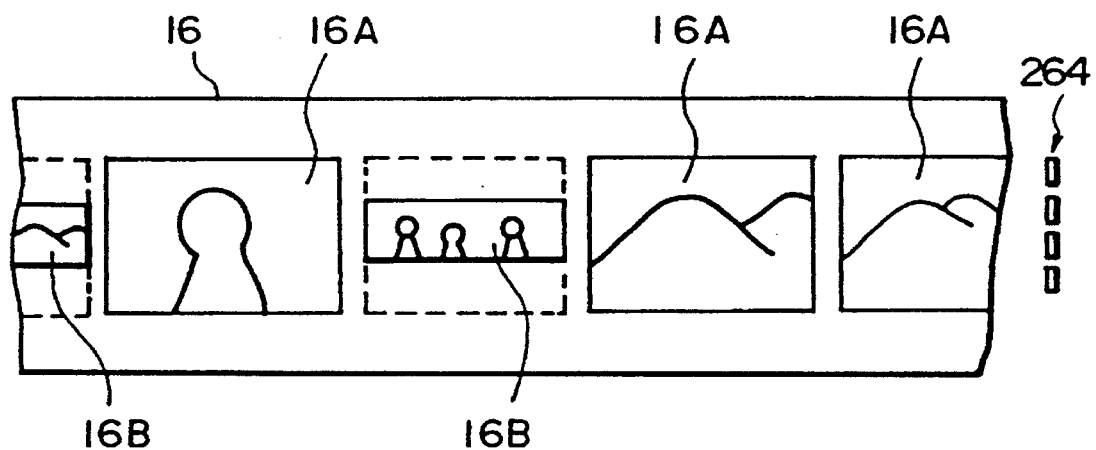
FIG. 6 is a plan view illustrating a size of each image frames recorded on a negative film.

The printing opening 206 has the same size as a full-size image frame 16A of the negative film 16 (see FIG. 6). In the negative film carrying path 204, carrying rollers 208, 210, 212, 213 are disposed between the upstream side of the printing opening 206 (on the left-hand side in FIG. 4) and the downstream side thereof (on the right-hand side in FIG. 4) corresponding to the back surface (underside) of the negative film 16. As shown in FIG. 5, the respective rollers 208, 210, 212, and 213 are provided with sprockets 214 at one of the axial ends of the respective roller axes. The respective sprockets are engaged with a teeth portion formed on an endless timing belt 216.

The timing belt 216 is wound around the sprocket 214 provided for the carrying roller 208 which is positioned at the most upstream side, and the sprocket 214 which is positioned at the most downstream side and provided for a rotation axis of a pulse motor 218. The pulse motor 218 is connected through a driver 222 to a control unit 220 (see FIG. 10), and is driven step-by-step in response to a driving signal from the control unit 220. Thus, when the pulse motor 218 rotates, the respective carrying rollers 208, 210, 212, and 213 are driven to rotate in the same rotating direction at the same rotating velocity.

In the opening/closing cover 202, one side edge of a case-like cover body 224 is pivotally supported by a bar 226 secured to the pedestal 200. The opening/closing cover 202 can be opened and closed pivotally on the bar 226 with respect to the pedestal 200.

A through-hole 228 corresponding to the printing opening 206 is provided in a bottom of the cover body 224. In addition, the cover body 224 is provided with an upper guide-base 230 at a position corresponding to the negative film carrying path 204 in a closed condition. Negative film guide walls 232 are integrally provided for the upper guide base 230 at the entrance side and the exit side of the negative film 16, respectively. The negative film guide wall 232 on the entrance side has a tapered upstream edge in the negative film carrying direction, and the negative film guide wall 232 on the exit side has a tapered downstream edge in the negative film carrying direction. The tapered edges are provided to form a slightly larger space than a thickness of the negative film 16 between the negative film guide wall 232 and the bottom surface of the negative film carrying path 204. The tapered edges ensure the carrying path for the respective transverse edge portions of the negative film.

Idle rollers 234, 236, 238, and 239 are disposed corresponding to the carrying rollers 208, 210, 212, and 213 between the respective guide walls 232 of the upper guide base 230. When the opening/closing cover 202 is closed, the negative film 16 is hold between the idle rollers 234, 236, 238, and 239 and the carrying rollers 208, 210, 212, and 213, and can be carried.

Disposed on the upper guide base 230 is an upper mask 240 at the intermediate portion thereof in the negative film carrying direction. The upper mask 240 can relatively move with respect to the upper guide base 230, and has an opening at a position corresponding to the through-hole 228. The upper mask 240 is removably provided for a mask base 242. In this embodiment, two types of the upper masks 240 are used, one having a full-size opening, and the other having a panoramic opening. These upper masks 240 can be selectively exchanged according to the size of image frames (see FIG. 6) which is recorded on the negative film 16.

Figure 7:
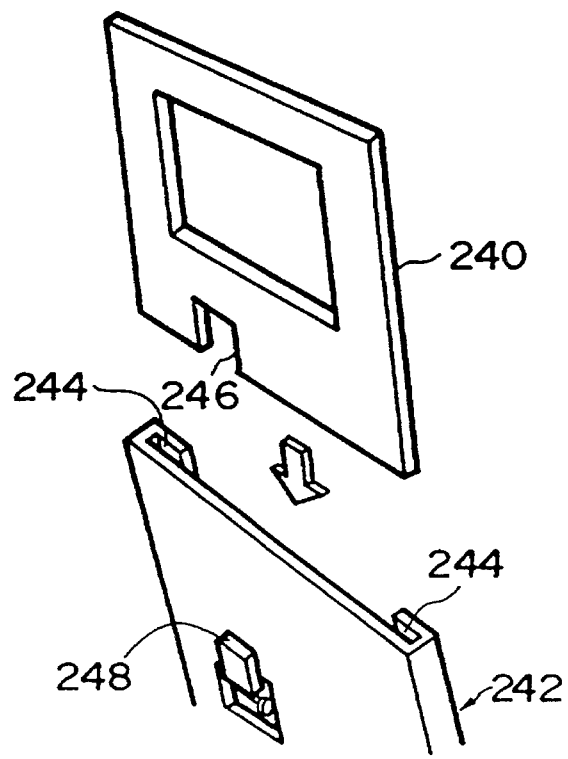
FIG. 7 is a perspective view of a mask base.

As shown in FIG. 7, a mask base 242 has the respective transverse edge portions which are opposed with each other and bent to form substantially channel section, thereby forming a rail portion 244. The upper mask 240 is inserted into the rail portion 244 so that the upper mask 240 is supported by the mask base 242. A type of the upper mask 240 (for example, with the full-size opening) has a notch 246 at the pointed edge on the entrance side of the upper mask 240. At a position corresponding to the notch 246, a limit switch 248 is mounted on the rail portion 244.

Figure 10:
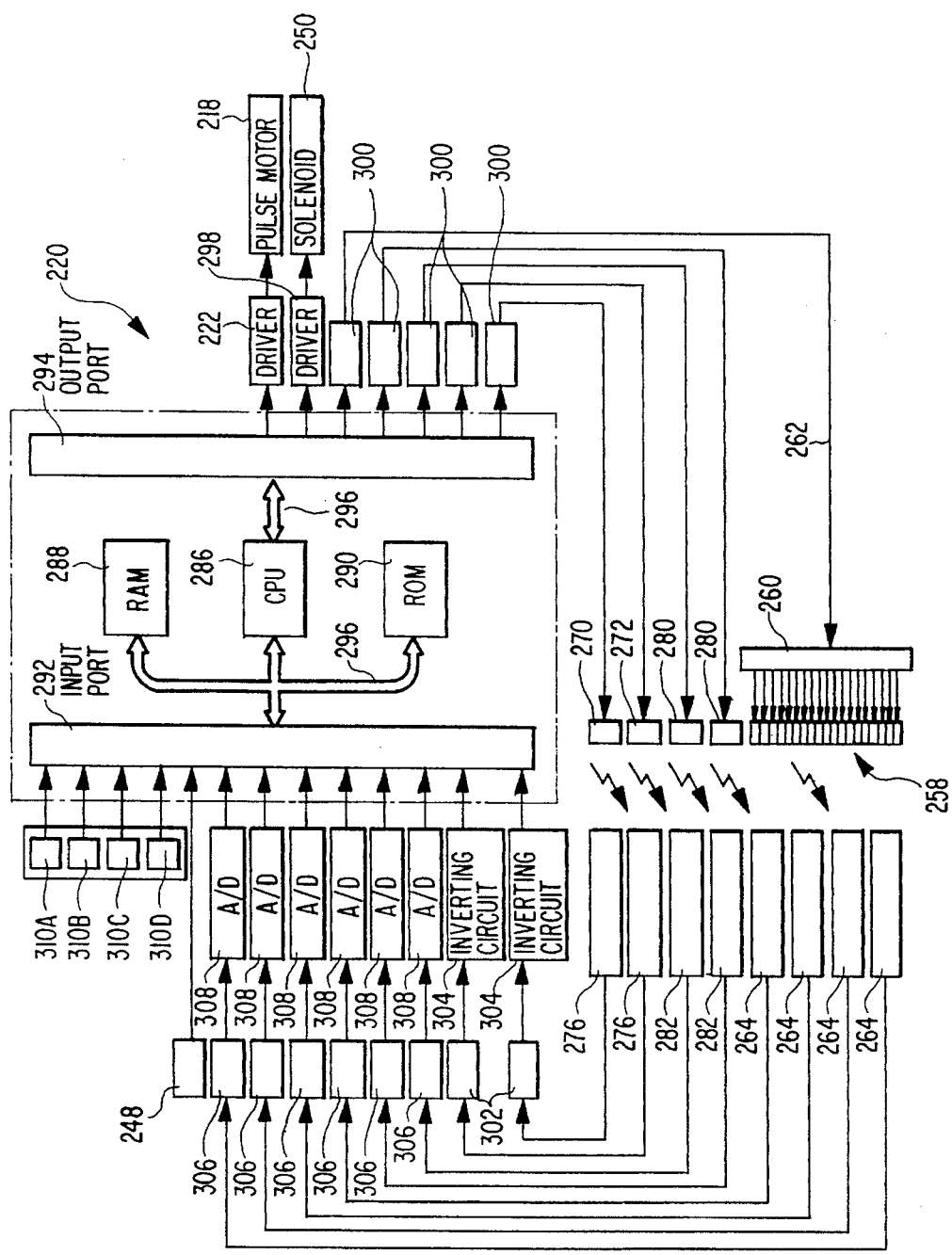
FIG. 10 is a block diagram of a control unit of the negative carrier.

A signal line extending from the limit switch 248 is connected to the control unit 220 (see FIG. 10). Consequently, only when the upper mask 240 with the panoramic size opening is inserted, a contact point to contact the limit switch 248 with the upper mask 240 is switched. Thus, it is possible to discriminate the type of the inserted upper mask depending on ON/OFF condition of the limit switch 248.

The mask base 242 is pivotally supported about a pivoting axis in the vicinity of the pivoting axis of the cover body 224 to correspond to a solenoid body 250 mounted on the pedestal 200 with the cover body 224 closed. The solenoid 250 is connected through a driver 298 to the control unit 220 (see FIG. 10). When the solenoid body 250 is energized in response to a signal from the control unit 220, the mask base 242 is attracted by magnetic force to the solenoid 250. Accordingly, the upper mask 240 can be tightly contacted with the printing opening 206 of the negative film carrying path 204. Further, the negative film 16 is positioned across the optical axis, and can be held between the upper mask 240 and the printing opening 206.

Figure 8:
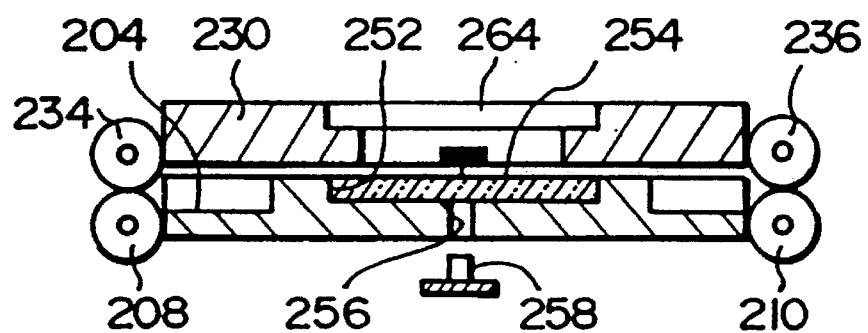
FIG. 8 is a side sectional view of a guide path for the negative carrier.

As shown in FIG. 8, a rectangular groove 252 is provided at a position upstream of the printing opening 206 on the bottom surface of the negative film carrying path 204. The groove 252 has longitudinal sides which is identical with the transverse length of the negative film carrying path 204. A transparent glass plate 254 is fitted into the groove 252 to form a coplanar surface with respect to a peripheral guide surface. A slit hole 256 passing through the negative film carrying path 204 is provided in the bottom of the groove 252. The slit hole 256 has longitudinal sides identical with the transverse length of the negative film carrying path 204. The longitudinal sides of the slit hole 256 are disposed along the cross direction of the negative film carrying path 204. Corresponding to the slit hole 256, a plurality of LED chips serving as light emitting portions are disposed on the back surface of the negative film carrying path 204 in the cross direction of the negative film carrying path 204, i.e., along the cross direction of the negative film carrying path 204.

Figure 9:
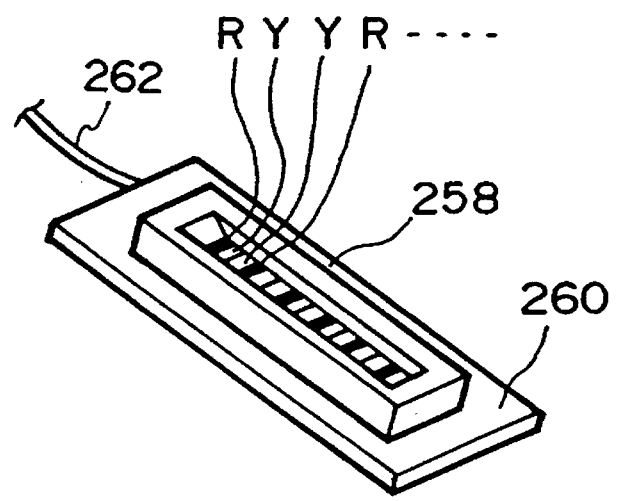
FIG. 9 is a perspective view of a LED chip.

As shown in FIG. 9, two-color LED chips 258 emitting R (red light) and Y (yellow light) are arranged on the substrate 260. These chips are arranged in the order of RYYRYYRYY ..., starting with left-hand side in FIG. 9. Therefore, a ratio of R to Y is 1:2, and luminous efficiencies of the respective colors are identical with each other.

The respective LED chips 258 are connected through a shared signal line 262 to the control unit 220 (see FIG. 10). Lights are emitted from the chips 258 in response to a signal output from the control unit 220, and are transmitted through the negative film 16 carried along the negative film carrying path 204.

The slit hole 256 corresponds to four image detecting plane sensors 264 provided in the upper guide base 230 of the cover body 224 with the cover body 224 closed. Consequently, the image detecting sensors 264 detect transmission exposure of the light transmitted through the negative film 16. As shown in FIG. 6, the four image detecting sensors 264 are disposed along the cross direction of the negative film 16, and connected to the control unit 220 through each independent signal line. The control unit 220 obtains a distribution of the transmission density of the photographic film based on output signals from the image detecting sensors 264. Thus, the control unit 220 can detect a boundary between the image frame 16A and the base portion, i.e., an image frame edge.

As shown in FIG. 6, the image detecting sensors 264 are arranged within the range of longitudinal dimension of the full-size image frame 16A (in the cross direction of the negative film 16). Further, two of those on the intermediate side of the negative film 16 are arranged within the range of longitudinal dimension of the panoramic size image frame 16B having a panoramic image plane, while -the rest of those are arranged outside the range of longitudinal dimension of the panoramic size image frame 16B. Accordingly, if two of the image detecting sensors 264 at the respective ends of the image detecting sensors 264 detect values having the base density of the negative film 16, it can be determined that the detected image frame is the panoramic size image frame 16B.

Figure 16:
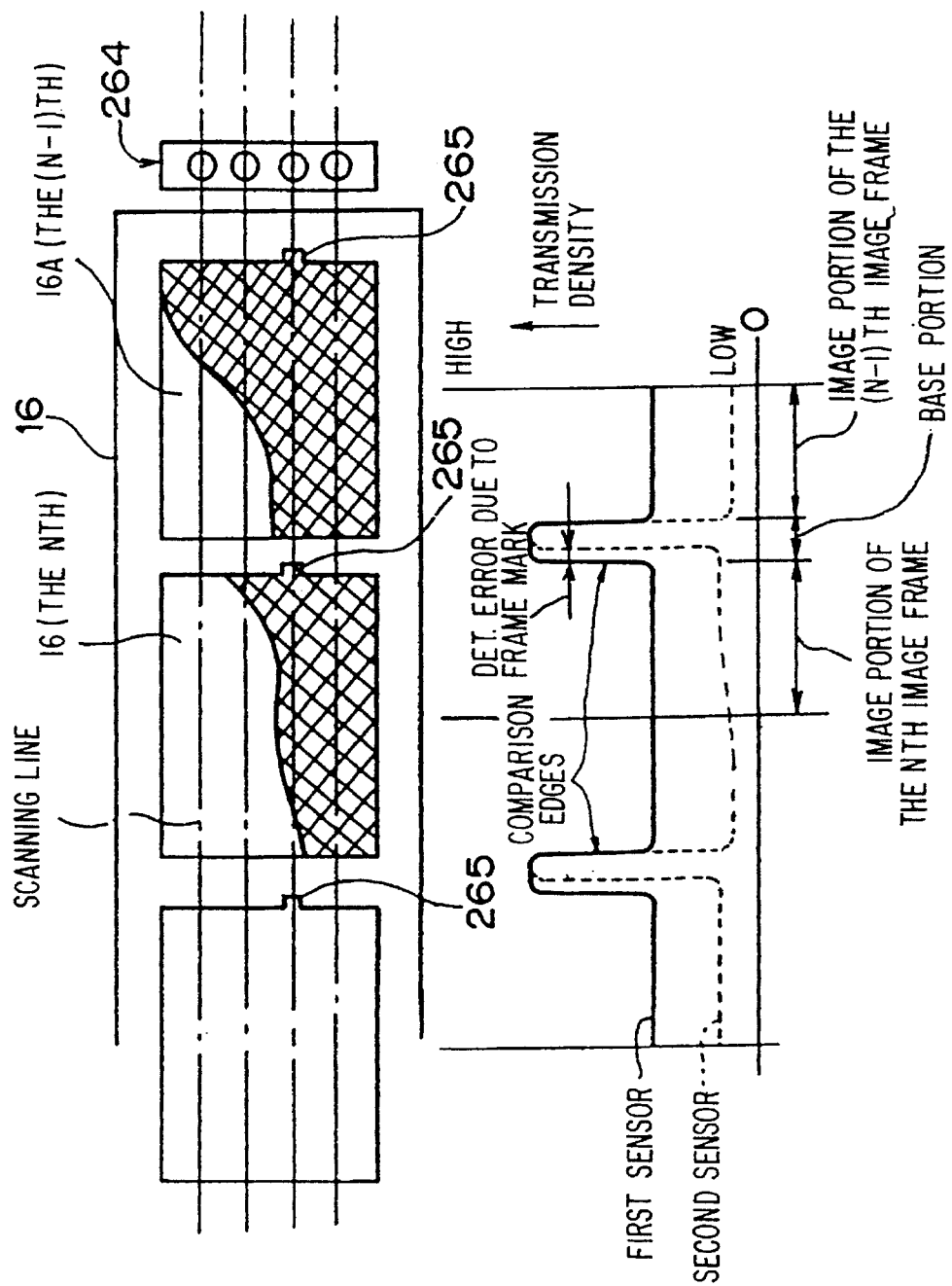
FIG. 16 is a characteristic diagram showing the image frame having frame marks and a distribution of a transmission density.

As shown in FIG. 16, the negative film 16 may have a frame mark 265 slightly projecting from an edge of each image frame. The frame mark 265 is exposed during photographing by a camera to have a high density. Accordingly, the frame mark 265 has a low transmission density, and is apt to be defined as a part of the image. When one of scanning lines of the image detecting sensors 264 passes across the frame mark 265, an output value of each sensor varies from each other. Further, a distribution of the density is also varied depending on a photographed condition of an image. Thus, in the embodiment, the image detecting sensor 264 disposed corresponding to the highest density position is defined as a first sensor, and the image detecting sensor 264 disposed corresponding to the lowest density position is defined as a second sensor. Output values of the first and second sensor are selected so that it is decided whether or not the detected values are appropriate according to the difference between the respective output values.

Figure 17:
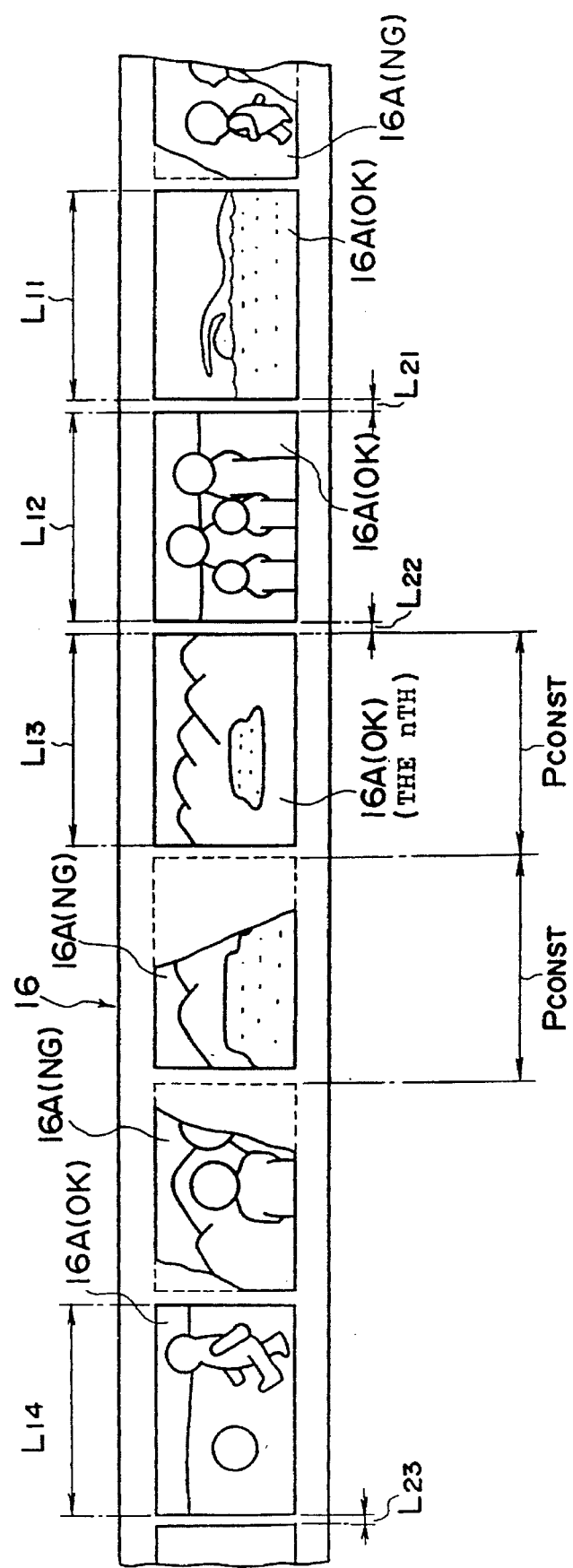
FIG. 17 is a plan view of the negative film showing each dimension for perceiving a photographing tendency.

If it is decided that the detected values are inappropriate, the image frame is carried by the predetermined amount to be positioned instead of regarded as an error. Meanwhile, as shown in FIG. 17, a faulty image frame 16A (NG) is carried for positioning by a constant interval ($P_{CONST}$) measured from a front edge of the nearer normal image frame 16A (OK) preceding the faulty image frame 16A (NG). The constant interval $P_{CONST}$ is defined depending on both image frame lengths (the carrying directional length) $L_{1n}$ of all the normal image frames 16A (OK) preceding the faulty image frame 16A (NG) to be positioned, and intervals $L_{2n}$ between the normal image frames. Namely, a tendency of the image frame size photographed by a camera can be obtained by calculating an average of the image frame lengths $L_{1n}$. A tendency of a feed pitch in the camera can be obtained by calculating an average of the $L_{2n}$. The constant interval $P_{CONST}$ is determined depending on the tendencies, thereby enabling the faulty image frame to be accurately positioned.

If the faulty image frame 16A (NG) is a leading frame, the predetermined reference interval (feed amount based on a specification) is defined as the constant interval.

The bottom surface of the negative carrying path 204 is s lightly deepened at the transverse intermediate portion thereof further upstream the slit hole 256. Consequently, the bottom surface never contacts with the negative film 16 during carrying the negative film 16. Namely, since the bottom surface contacts only with the respective transverse edge portions of the negative film 16, the image frame face of the negative film 16 can avoid damage. The deepened bottom surface is longitudinally provided with two circular holes 266, 268 in the transverse intermediate portion of the negative film carrying path 204. LED elements 270, 272 are buried in the circular holes 266, 268. The LED elements 270, 272 are connected to the control unit 220, respectively, and are adapted to emit in response to a signal from the control unit 220.

The LED element 270 nearer to the slit hole 256 serves to detect a splice tape or managing tape. The splice tape is applied to unite a plurality of the negative films 16 to form a roll. The managing tape is attached on the respective negative films 16. On the other hand, in the negative film carrying path 204, the LED element 272 provided on the entrance side of the negative film serves to detect presence or absence of the negative film 16. The LED elements 270, 272 are arranged corresponding to a tape sensor 274 and the negative film presence or absence sensor 276 which are mounted on the upper guide base 230, respectively. The tape sensor 274 and the negative film presence or absence sensor 276 are connected to the control unit 220, respectively.

LED elements 280 are buried in the respective transverse ends of the negative film carrying path 204 between the LED elements 270 and 272. The LED elements 280 are connected to the control unit 220, and are provided corresponding to bar code sensors 282 which are mounted at the respective transverse ends of the upper guide base 230. The bar code sensors 282 are connected to the control unit 220. Bar codes provided for the negative film 16 are transmitted by the light emitted from the LED elements 280, and are detected by the bar code sensors 282. In such a way, the bar code can be decoded in the control unit 220.

Figure 11:
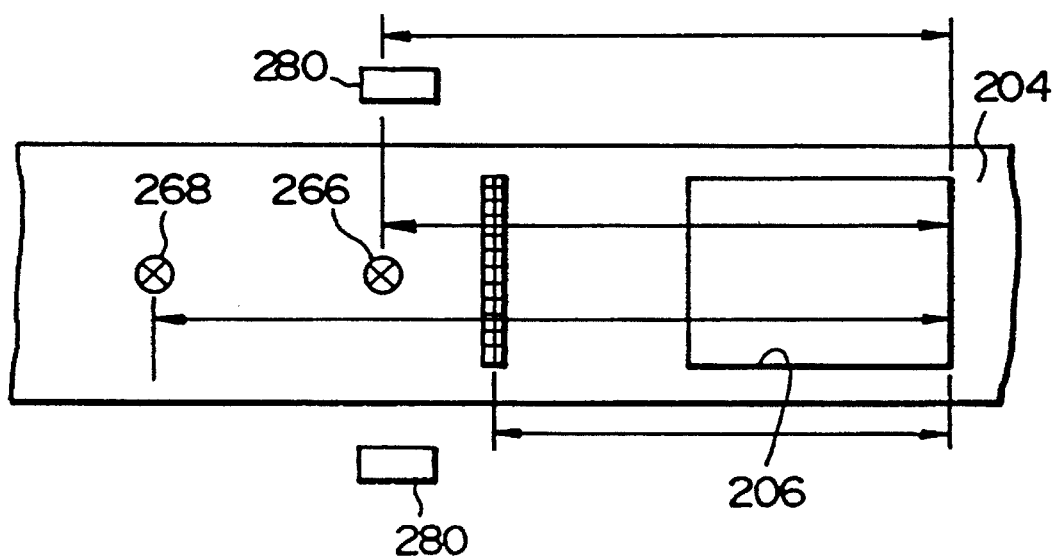
FIG. 11 is a plan view illustrating a position and relationship between a printing opening and sensor position.

The bar code sensors 282 are mounted on frame members 284 which are rockably provided with respect to the upper guide base 230. The bar code sensors 282 are adapted to track the negative film 16 which is meanderingly carried. Accordingly, for all the meandering negative film 16, the bar code sensors 282 can read the bar code provided for a narrow portion at the transverse end of the negative film 16. As shown in FIG. 11, the positions of the respective sensors are determined on the basis of a reference side (in the embodiment, a side furthermost from these respective sensors, i.e., a right-hand side in FIG. 11) of the printing opening 206.

As shown in FIG. 10, the control unit 220 comprises CPU 286, RAM 288, ROM 290, input port 292, output port 294, and bus 296. The input port 294 is connected through the driver 222 to a pulse motor 218, and through a driver 298 to the solenoid body 250, respectively.

On the other hand, the output port 294 is connected through LED driver 300 to the LED elements 270, 272, 280, and to the substrate 260 of the LED chip 258.

The input port 292 is connected to the tape sensors 274 and the negative film presence or absence sensors 276 through comparators 302 and inverted circuits 304. Further, the input port 292 is connected through amplifiers 306 and A/D converters 308 to two bar code sensors 282 and four image detecting sensors 264. Moreover, the input port 292 is connected to four key switches 310A, 310B, 310C, and 310D which are mounted on the pedestal 200 of the negative carrier 18. Operation of these key switches allows the negative film 16 to be fed forward and backward, and finely adjusted at the stop position.

The control unit 220 is connected with the controller 162 of the printer-processor 10. The control unit 220 communicates with the controller 162 in the following cases, i.e., where the image frame has been positioned, where the next image frame should be operated for positioning after completion of the printing process of the image frame, and where an abnormality occurs in the negative film carrying system or the image plane detection in the negative carrier 18. If such an abnormality occurs, an alarm (not shown) mounted on the printer-processor 10 is adapted to signal the abnormality, and to interrupt the process. However, the output of the abnormality signal can be limited according to each mode since the negative carrier 18 is controlled in each mode, i.e., a manual mode, an automatic mode, or a fully automatic mode.

In the manual mode, it is not necessary to alert the operator to the abnormality except for a few cases since the operator monitors the apparatus. In the fully automatic mode, it is undesirable for operation efficiency to signal every abnormality to interrupt the process. For example, when one image frame is overexposed, an optimal print of the image frame can not be expected in the fully automatic mode. However, reprinting of the image frame after a series of operations is more efficient in comparison with operating the printing process switched to the manual mode for each abnormality. Therefore, in the embodiment, output condition of the abnormality signal is varied according to the operation mode (manual mode, automatic mode, and fully automatic mode) of the printer-processor 10 on which the negative carrier 18 is mounted.

Table 1 shows whether or not the abnormality signal should be output according to the respective abnormality contents, or causes, in each control mode. A mark O in the control mode column refers to presence of output of the abnormality signal while a mark X refers to absence of output of the abnormality signal.

TABLE 1

| | | | Alarm Level | | | |
|---|---|---|---|---|---|---|
| Code | Abbr. | Results of Detection | A | B | C | Contents |
| 0 | OK | NORMAL | | | | Frame is normally detected. |
| 1 | SU | UNDEREXPOSURE | O | X | X | Frame has undetectable right and left edges. |
| 2 | SO | OVEREXPOSURE | O | X | X | Frames have an undetectable edge due to bleeding. |
| 3 | FI | FAULTY INTERVAL | O | X | X | Interval between frames is irregular. |
| 4 | FL | FRAME SIZE ABNORMALITY | O | X | X | Frame has an irregular frame size. |
| 5 | | FRAME OVERLAP | O | X | X | Frames have an overlap region not more than 5 mm. |
| 6 | KB | PARTIAL FOG | O | X | X | Frame has a fog at back end thereof |
| 7 | SN | PARTIALLY UNEXPOSED NEGA | O | X | X | Frame is partially unexposed. |
| 8 | F/H | NEGA SIZE ABNORMALITY | O | O | O | Mask is of identical with image in size. |
| 9 | TOP | LEADING EDGE ABNORMALITY | O | X | X | Top frame is undetectable. |
| 10 | SNN | UNEXPOSED NEGA | O | X | O | Entire negative film is unexposed. |
| 11 | KBR | FOGGY NEGA | O | X | O | Entire negative film is foggy. |
| 12 | NEE | NEGA END ABNORMALITY | O | O | O | Negative film is carried with jammed, meandered or the like. |
| 13 | | | | | | |
| 14 | | | | | | |
| 15 | | OTHER ABNORMALITIES | O | X | O | Frame can not be accurately positioned by the other causes. |

A . . . Automatic Control, B . . . Fully Automatic Control, C . . . Manual Control ROM 290 has a stored program to, for example, compensate a mounting position of each sensor and compensate a deviation of a value detected by each sensor. The program is set as a correction coefficient before shipment of the negative carrier 18. To compensate the mounting position, a distance between the reference side of the printing opening 206 and each sensor is measured by the pulse number of the pulse motor 218, and an error between the measured pulse number and the preset pulse number is corrected. A correction coefficient is set for each image detecting sensor 264 to compensate a deviation of each sensor. Especially, each correction coefficient is set for each sensor 264 such that the four image detecting sensors 264 can detect the same quantity of light from the respective LED chips 258.

Each quantity of light emitted from LED elements and LED chips corresponding to the respective sensors 264, 282, is set to be suitable for the range of each A/D converter 308 for converting analog values detected by the image detecting sensors 264 and the bar code sensors 282 to digital values, before shipment of the negative carrier 18.

RAM 288 has a stored map for setting a transmission density of the negative film on the basis of data detected by the image detecting sensor 264. Therefore, it is possible to obtain a distribution of transmission density in one carrying step by the pulse motor 218 (in the embodiment, the interval between the center of the image frame 16A or 16B and that of the adjacent image frame is defined as one carrying step). The image frame edge is determined based on the distribution of transmission density, and stored corresponding to the feed pulse number of the pulse motor 218.

A description will be given of the operation of the embodiment hereinafter.

First, a normal printing procedure will be described in the following.

When the printing process is started, the light source 38 is turned on and the negative carrier 18 is driven to position the negative film 16. LATD (large area transmittance density) of the negative film 16 is measured by the densitometer 56. According to the measured data and the manual input data, the exposure correction is set and an exposure (exposure time) is calculated, whereby an optimal print condition can be provided.

Meanwhile, the negative films 16 may have a full-size image frames of a full-size type 16A as well as image frame of a panoramic size type 16B in the same film. Printing processes for the respective size types differ in mask area for negative film, printing magnification, mask area for photographic paper, carrying interval of photographic paper. Therefore, after printing one of both the size types while passing the other, it is efficient to print the other consecutively. Accordingly, in the embodiment, the print condition is set according to the type of the upper mask 240 which has been loaded in the mask base 242. Since the mask base 242 is loaded with the upper mask 240, the type of the upper mask 240 can be discriminated depending on the ON/OFF condition of the limit switch 248. Thus, the printing process is controlled to position only the image frame corresponding to the mask type detected by the limit switch 248, and pass the other type of the image frame.

In the four image detecting sensors 264 of the negative carrier 18, as described above, two of those on the respective transverse direction ends are arranged outside the range of transverse length of the panoramic size image frame 16B, but are still arranged inside the range of longitudinal length of the full-size image frame 16A. Therefore, when the two outermost image detecting sensors 264 detect a base density of the negative film 16, the image frame can be defined as the panoramic size image frame 16B. If an image density is detected, the image frame can be defined as the full-size image frame 16A. For example, if the image detecting sensors 264 detect the panoramic size image frame 16B with full-size upper mask 240 which has been loaded to the mask base 242, this image frame is passed. The next full-size image frame 16A is positioned at the printing position. Accordingly, it is not necessary to change the conditions so as to correspond to the respective frame sizes in the course of a continuous printing process so that the printing process efficiency can be improved.

Next, the photographic paper 54 is carried to the exposure chamber 52 to be positioned, thereafter the shutter 50 is opened. The opened shutter 50 allows light emitted from the light source 38 to pass through the filter portion 40 and the negative film 16 into the exposure chamber 52. When the printing process is started to print the image frame of the negative film 16 on the photographic paper 54 positioned in the exposure chamber 52, the respective filters C, M, and Y positioned on the optical axis are moved according to the exposure condition. The shutter 50 is closed after the predetermined exposure time. In the operation set forth hereinbefore, one image frame of the negative film 16 has been completely printed. The above operation is repeated to move the photographic paper 54 so as to carry printed parts thereof to the reservoir portion 70 in order.

The photographic paper 54 carried to the reservoir portion 70 is further carried to the color development portion 74 wherein the photographic paper 54 is immersed in developer for development. The developed photographic paper 54 is carried to a bleach-fix portion 76 for fixing. The fixed photographic paper 54 is carried to the rinse portion 78 to be washed in water. The photographic paper 54 washed in water is carried to the drying portion 80 for a drying process.

In the dried photographic paper 54, a cut mark is detected in the cutter portion 84 so that the photographic paper 54 is cut for each image frame.

In the printer-processor 10, positioning of the image frame can be effected in the manual control mode as well as in the automatic control mode. In addition, in the so-called automatic control mode, the operator monitors the negative carrier 18 at least to operate the print start button. On the other hand, in the so-called fully-automatic control mode, all the operations including the print start step are effected in response to a signal communication between the control unit 220 of the negative carrier 18 and the controller 162 of the printer-processor 10. Thus, the printer-processor 10 is switchable in three control stages (the manual control, the automatic control, and the fully automatic control).

In the embodiment, the output of the abnormality signal from the negative carrier 18 is limited according to each control mode to prohibit an unnecessary alarm provided in spite of the monitoring operator.

Namely, as shown in Table 1, in the manual control mode, the abnormality signal is output in the cases of Negative Size Abnormality (Code 8), Unexposed Negative Film (Code 10), Foggy Negative Film, (Code 10), Negative Film End Abnormality (Code 12), and Other Abnormalities (Code 15).

In the fully automatic control mode, the abnormality signal is not output in the case that there is an only abnormality on a finished condition and the printing process can be smoothly performed. It is output in the only cases of Negative Size Abnormality (Code 8) and Negative Film End Abnormality (Code 12).

In the automatic control mode, the abnormality signal is output for each abnormality.

In such a way, the abnormality signal is output according to each control mode to prohibit an unnecessary alarm provided in spite of the monitoring operator. Accordingly, the fully automatic control mode can be utilized with advantage.

Further, it is possible to avoid interrupting the operation of the printer-processor per se for each unnecessary abnormality signal, and eliminate action for each abnormality. As a result, the printing operation efficiency can be improved.

In the embodiment, the negative carrier 18 automatically controls to position each image frame 16A (16B) of the negative film 16 at the printing position (in the fully automatic control mode). Each image frame edge is detected by the image detecting sensors 264. The negative carrier 18 controls to carry the image frame edge corresponding to the feed pulse number of the pulse motor 218.

Figure 12:
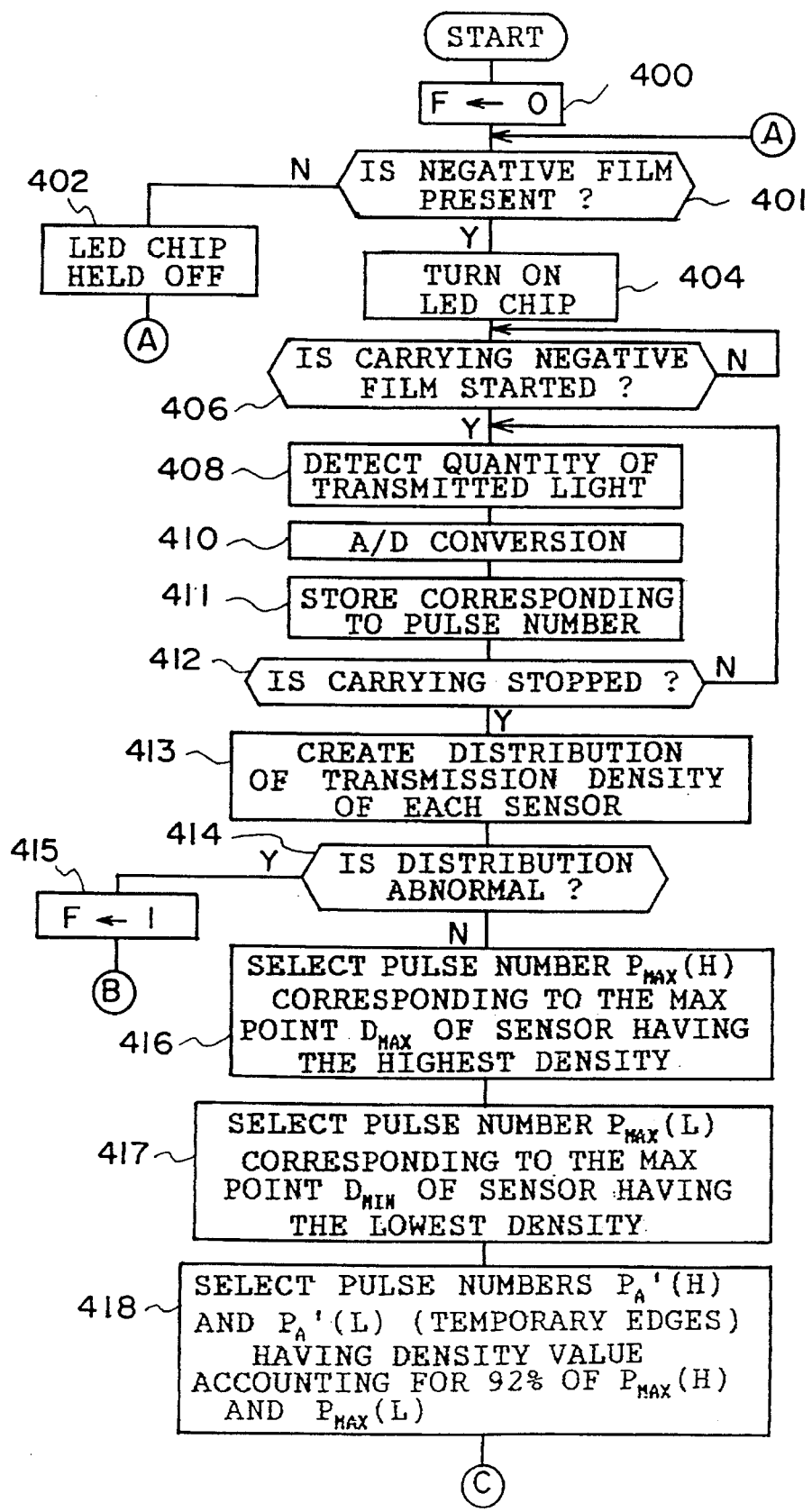
FIGS. 12A and 12B are control flowcharts of positioning of the image frame.
Figure 12B:
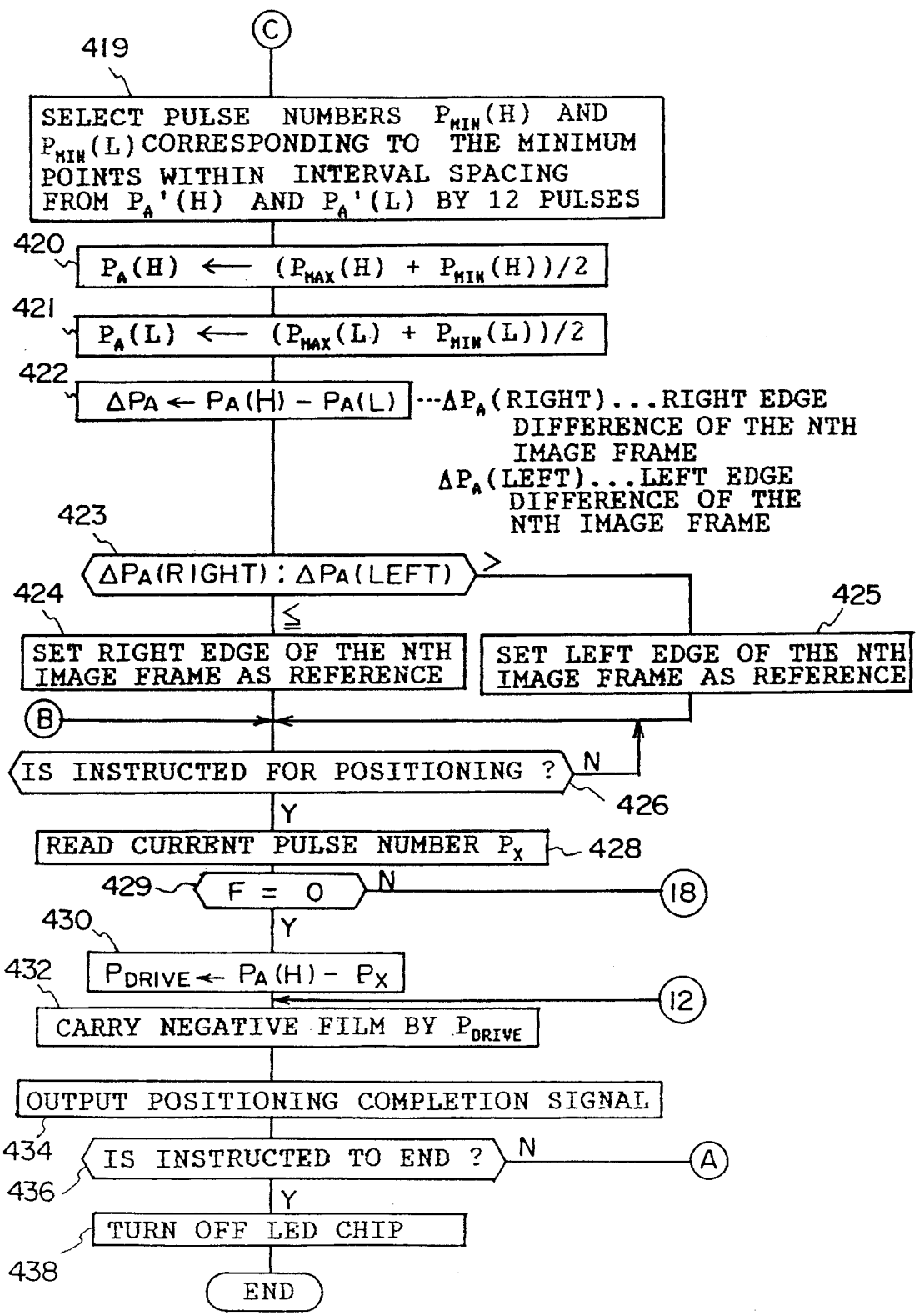

Referring now to the flowcharts of FIGS. 12A and 12B, a positioning procedure of the image frame will be described hereinafter.

First, in Step 400, a flag F is reset to zero. Next, in Step 401, a negative film presence or absence sensor 276 determines whether or not the negative film 16 is inserted into the negative carrier 18. If the negative film 16 is not inserted, the operation proceeds to Step 402 where the LED chips 258 are held off. If the negative film 16 is inserted, the operation proceeds to Step 404 where the LED chips 258 are turned on. Since the LED chips are used for light sources, ON-OFF control of the LED chips 258 is very easy and the LED chips life should not be reduced.

Next, if it is determined that carrying the negative film 16 is started to position the negative film 16 at the printing position in Step 406, the operation proceeds to Step 408 to detect a quantity of transmitted light which passes through the slit hole 256 to permeate through the negative film 16. Consequently, in Step 410, the quantity of transmitted light is converted into digital signals in the A/D convertor 308. Each converted data is stored corresponding to the feed pulse number (in Step 411).

The Steps 408, 410, and 411 are repeated until, in the next Step 412, it is determined that the negative film 16 is stopped from carrying. If, in Step 412, it is determined that the negative film 16 is stopped from carrying, the operation proceeds to Step 413 where each distribution of transmission density of the respective four sensors in one carrying step is created based on the stored data.

In Step 414, it is decided whether or not there is an abnormal distribution of the transmission density. Namely, the abnormal distribution of the transmission density is detected if the image frame 16A (or 16B) has a half fog, an unexposed portion, or is in an underexposure condition or an overexposure condition. If the abnormal distribution is detected in Step 414, it is decided that the image frame edge is undetectable. The operation proceeds to Step 415 where a flag F is set to 1. Thereafter, the operation proceeds to Step 426 as described later.

If it is decided that the distribution of the transmission density is normal in Step 414, it is decided the frame edge is detectable, and the operation proceeds to Step 416.

In Step 416, a pulse number $P_{MAX}$ (H) of a maximum point $D_{MAX}$ of the sensor (the first sensor) disposed corresponding to the highest density position in the four sensors is selected. Subsequently, in Step 417, a pulse number $P_{MAX}$ (L) of a maximum point $D_{MIN}$ of the sensor (the second sensor) disposed corresponding to the lowest density position in the four sensors is selected. In Step 418, feed pulse numbers $P_A'$ (H) and $P_A'$ (L) corresponding to density values accounting for 92% of the maximum points are determined and are defined as temporary edges. In Step 419, the minimum point is selected within an interval having a constant pulse (12 pulses in the embodiment) as measured from the temporary edge $P_A'$. Thus, feed pulse numbers $P_{MIN}$ (H) and $P_{MIN}$ (L) corresponding to the minimum points are set. In Step 420, an average between the maximum point feed pulse $P_{MAX}$ (H) and the minimum point feed pulse $P_{MIN}$ (H), i.e., $(P_{MAX}(H)+P_{MIN}(H))/2$ is calculated to set a pulse $P_A$ (H) corresponding to an edge of the image frame 16A (16B). In Step 421, as in the case of Step 420, an average between the maximum point feed pulse $P_{MAX}$ (L) and the minimum point feed pulse $P_{MIN}$ (L), i.e., $(P_{MAX}(L)+P_{MIN}(L))/2$ is calculated to set a pulse $P_A$ (L) corresponding to the edge of the image frame 16A (16B).

In Step 422, a difference $\Delta P_A$ between the pulse $P_A$ (H) and the $P_A$ (L) is found. The difference $\Delta P_A$ can be obtained every carrying step at two points, i.e., at the right edge of the Nth frame (the image frame having a detectable edge), and at the left edge of the (N−1)th frame as viewed from the centered maximum point. Next, in Step 423, the right edge $\Delta P_A$ of the (N−1)th frame detected in the preceding Step is compared with the left edge $\Delta P_A$ of the (N−1)th frame detected in the present Step. In Steps 424 and 425, a lower $\Delta P_A$ of the two differences $\Delta P_A$ is selected. An edge detecting point corresponding to $P_A$ (H) of the selected difference $\Delta P_A$ is defined as a reference point (if the differences $\Delta P_A$ are identical with each other, the right edge of the (N−1)th frame is selected).

The image frame edge pulse number $P_A$ is determined as described above, and is spaced at a substantially constant interval with respect to the negative film 16 which is underexposed or overexposed as well as the negative film 16 which is normally exposed. Therefore, a detecting error can be reduced in the range for positioning without adverse effects.

In addition, even if the negative film 16 has a frame mark, it is ensured to detect the image frame edge.

In Step 426, it is decided whether or not the controller 262 of the printer-processor 10 has instructed for positioning. If instructed for positioning, the operation proceeds to Step 428 to read a current feed pulse number $P_X$. Subsequently, in Step 429, it is decided whether or not the flag F is reset. If the flag F is reset, the operation proceeds to Step 430 for positioning on the basis of the detected edge. In Step 430, a feed amount $P_{DRIVE}$ is calculated based on the current feed pulse number $P_X$ and the image frame edge pulse $P_A$ (using the expression: $P_{DRIVE}=P_A-P_X$). Thereafter, the operation proceeds to Step 432.

Figure 18:
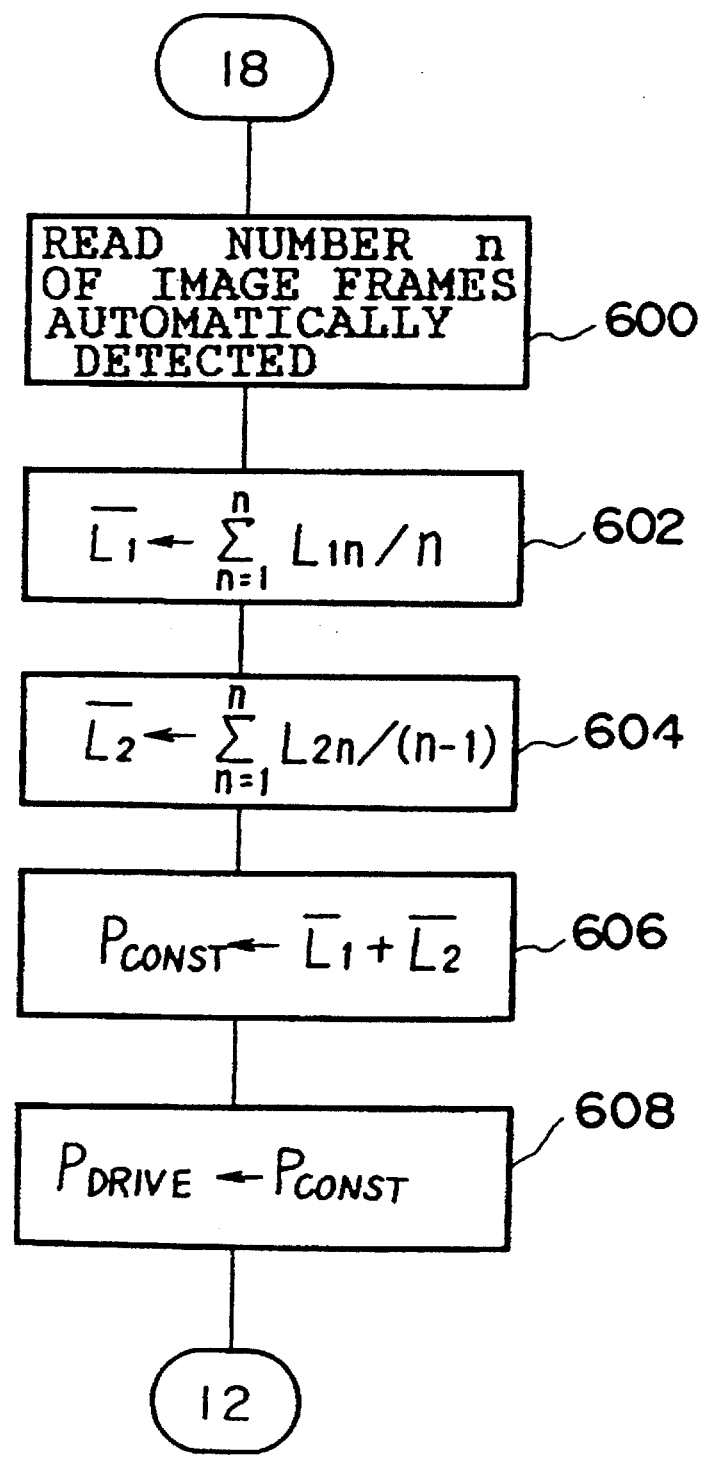
FIG. 18 is a control flowchart blanched from Step 429 of FIG. 12B, for setting a quantitative feed amount of the negative film.

If it is decided that the flag F is not reset in Step 429, the operation proceeds to Step 600 in FIG. 18 for positioning the image frame by a quantitative feed. In Step 600, the number n of the image frames whose edges have been automatically detected is read. In Step 602, the respective image frame lengths $L_{1n}$ of the n frames are summed up, and are divided by the frame number n to calculate an average of the image frame lengths (see the expression (1)).

$$\bar{L}_1 \text{ (AVERAGE)} = \frac{\sum_{n=1}^{n} L_{1n}}{n} \quad (1)$$

In Step 604, the respective intervals $L_{2n}$ of the image frames whose edges have been automatically detected are summed up, and are divided by the interval number (n−1) to calculate an average of the image frame intervals (see the expression (2)).

$$L_2 \text{ (AVERAGE)} = \frac{\sum_{n=1}^{n} L_{2n}}{(n-1)} \quad (2)$$

In Step 606, the average of the image frame lengths $L_{1n}$ and the average of the image frame intervals $L_{2n}$ are summed up, and are defined as a constant feed amount $P_{CONST}$. In Step 608, the constant feed amount $P_{CONST}$ is substituted for the $P_{DRIVE}$, and the operation proceeds to Step 432 of FIG. 12B.

In Step 432, the negative film is carried by the calculated feed amount $P_{DRIVE}$. This carrying step is defined as the carrying step in the above Step 406. Namely, it is possible to detect the edge of the image frame 16A (16B) immediately following the next image frame upstream the positioning point while the negative film is being carried for positioning.

When the selected image frame 16A (16B) is positioned at the printing position, in Step 434, the positioning completion signal is output to the controller 162 of the printer-processor 10. The printing process as discussed above can be performed in response to the positioning completion signal in the printer-processor 10.

In Step 436, it is decided whether or not the printing process has been instructed to end. If not instructed, the operation proceeds to Step 400. If instructed, the operation proceeds to Step 438 where LED chip 258 is turned off to end.

As described above, in the embodiment, two edges (the front edge of the Nth image frame and the backward edge of the (N−1)th image frame) are detected. That is to say, a boundary between the Nth image frame and the base portion, and a boundary between the (N−1)th image frame and the base portion are detected. The right edge and the left edge of the image frame to be positioned are compared with each other to select a more appropriate edge for using as a positioning reference. Since the selected edge is used a positioning reference, it is possible to detect the image frame edge accurately even if the negative film 16 has, for example, a frame mark 265 as shown in FIG. 16. As a result, the accurate positioning can be performed.

If the image frame edge can not be detected, a carrying amount for a constant feeding is determined depending on the sum of the average of the carrying directional lengths $L_1$ of the normal image frames 16A (OK) preceding the undetectable image frame 16A and the average of the intervals $L_2$ between the normal image frames. Therefore, the carrying amount is more suitable for a tendency of the processing negative film 16 per se than that of the predetermined specification. As a result, the accurate positioning can be implemented.

In the embodiment, the expressions (1) and (2) are used for calculating each average of the $L_1$ and the $L_2$. However, the following expressions (3) and (4) may be employed to calculate. The expressions (3) and (4) may cause error in a successful operation range for the printing process. However, the operation efficiency can be improved since the expressions allow a more rapid calculation to offset the error. The expressions are:

$$\overline{L_1} \text{ (AVERAGE)} = \overline{L_1}'/2 + L_1/2 \ldots (3);$$ and $$\overline{L_2} \text{ (AVERAGE)} = \overline{L_2}'/2 + L_2/2 \ldots (4);$$

where $\overline{L_1}'$ and $\overline{L_2}'$ are averages of the normal image frame lengths and of the intervals between the normal image frames over a range of the first to the (n−1)th, respectively.

The operation as described hereinbefore is defined as an image frame positioning control. To control the image frame positioning, high-accuracy is essential for the accurate detection of the image detecting sensors 264 and the accurate interval between the mounting positions of the sensors 264 and the printing position. Accordingly, in the embodiment, the accuracy correction of the negative carrier 18 is performed before shipment and each time power is turned on.

Figure 13:
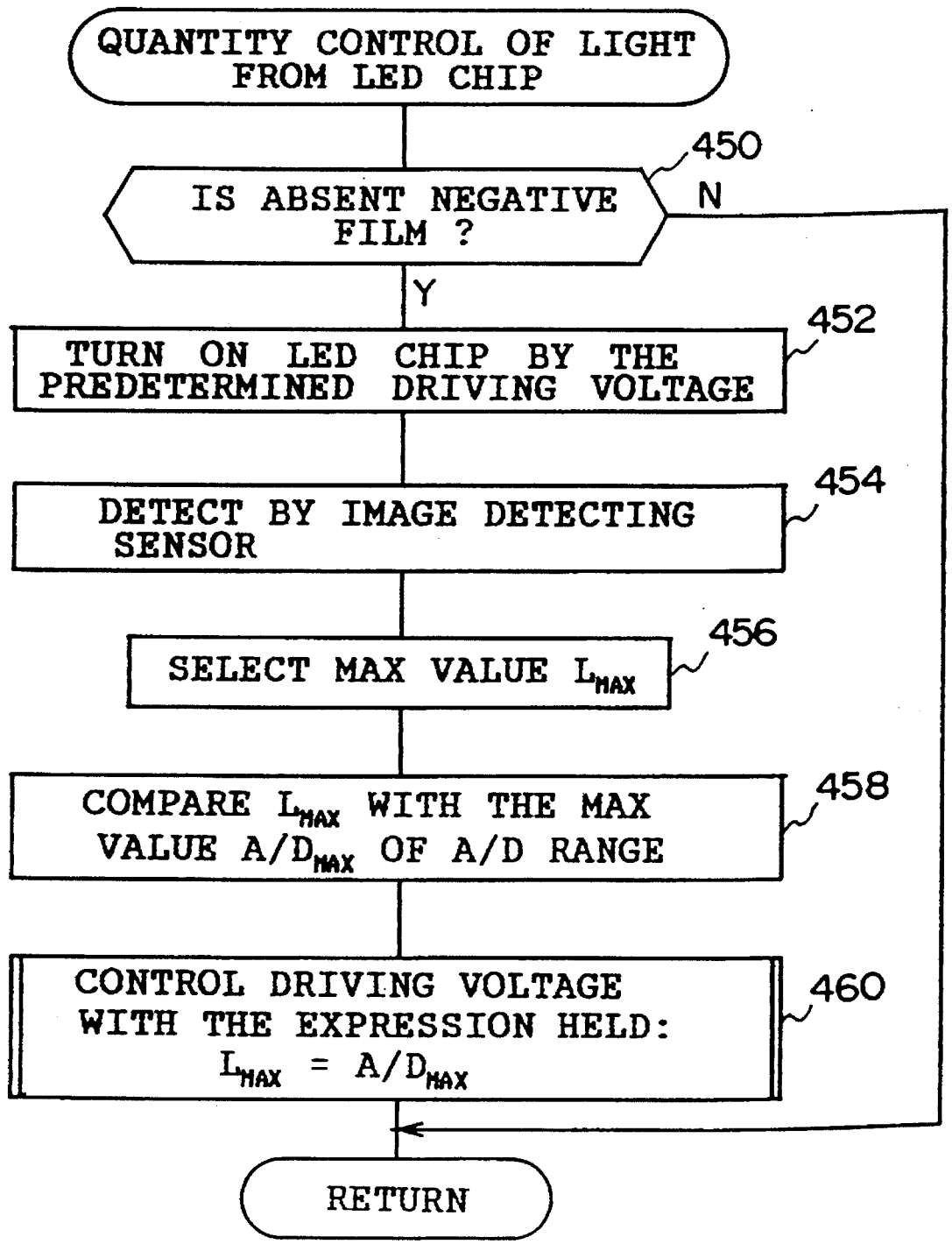
FIG. 13 is a control flowchart of adjustment of quantity of light of LED chip.

Referring now to the flowchart of FIG. 13, a description will be given of the procedure to adjust quantity of light emitted from the LED chips 258. The quantity of light emitted from the LED chips 258 is detected by the image plane sensors 264, and converted into digital data by the A/D converter 308. The A/D converter 308 has a limited range for conversion. Thus, when absence of the negative film 16 is detected in Step 450, the LED chips 258 are turned on in Step 452. The quantity of light is detected by the respective image detecting sensors 264 (in Step 454), and in Step 456, the respective top values in the detected quantity of light are selected to determine the maximum value of the top values.

The selected maximum value $L_{MAX}$ of the quantity of light is compared with the maximum range $A/D_{MAX}$ of the A/D converter 308 (in Step 458). In Step 460, driving voltage applied by LED drivers 300 is controlled such that the maximum value $L_{MAX}$ is given by the expression: $L_{MAX} = A/D_{MAX}$. Therefore, the detected values in the image detecting sensors 264 never depart from a dynamic range of the A/D converter 308, and the A/D converter 308 is ensured to read data. Additionally, since the LED chips 258 are applied to the light source, it is very easy to adjust or control the quantity of light.

Figure 14:
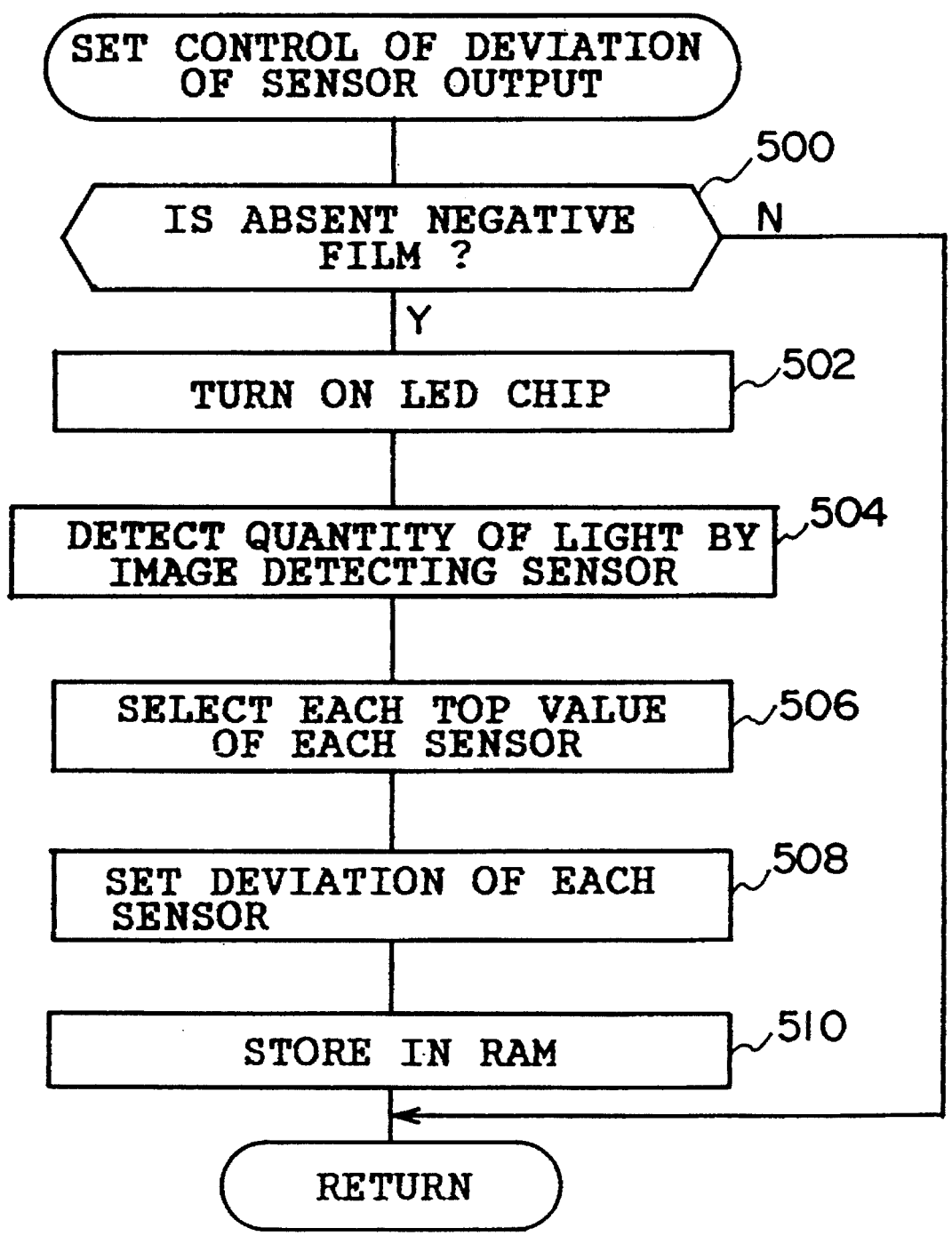
FIG. 14 is a control flowchart of compensation of a deviation of a sensor output.

The four image detecting sensors 264 detect with each slight error (a deviation) due to its detecting accuracy and temperature change even if detecting the same quantity of light. It is desirable to have the same output from the image detecting sensors 264 when detecting the same quantity of light. Thus, the deviation should be compensated. Referring now to the flowchart of FIG. 14, a description will be given of a set control procedure of a deviation of sensor output.

When absence of the negative film 16 is determined in Step 500, the LED chips 258 are lit up in Step 502. The quantity of light is detected by each image detecting sensor 264 (in Step 504), and in Step 506, the respective top values are selected in the detected values of the respective image detecting sensors 264. Thus far, the control is effected as in the case of the quantity control of light of the LED chips shown in FIG. 13. Therefore, the top values may be stored when the top values have been selected in the quantity control of light of the LED chips in Step 456 shown in FIG. 13.

In Step 508, the top output value of one sensor is defined as a reference value to determine the deviations of the top output values of the remaining three sensors. In Step 510, the deviation is stored as a correction coefficient a of each image detecting sensor 264.

It is assumed that, for example, the image detecting sensors 264 are $S_A$, $S_B$, $S_C$, $S_D$, respectively. If the quantity of light is expressed on the basis of the sensor $S_A$ ($S_A=1.0$) and the outputs of the remaining sensors are $S_B=0.9$, $S_C=0.8$, $S_D=0.9$, the respective correction coefficients are $\alpha S_A=1.00$, $\alpha S_B=1.11$, $\alpha S_C=1.25$, $\alpha S_D=1.11$. Namely, the respective correction coefficients a stored in Step 510 are multiplied by data input from each image detecting sensor 264 when the data are input. Accordingly, it is possible to use appropriate values in the A/D conversion and create a high-accurate distribution of transmission density.

Figure 15:
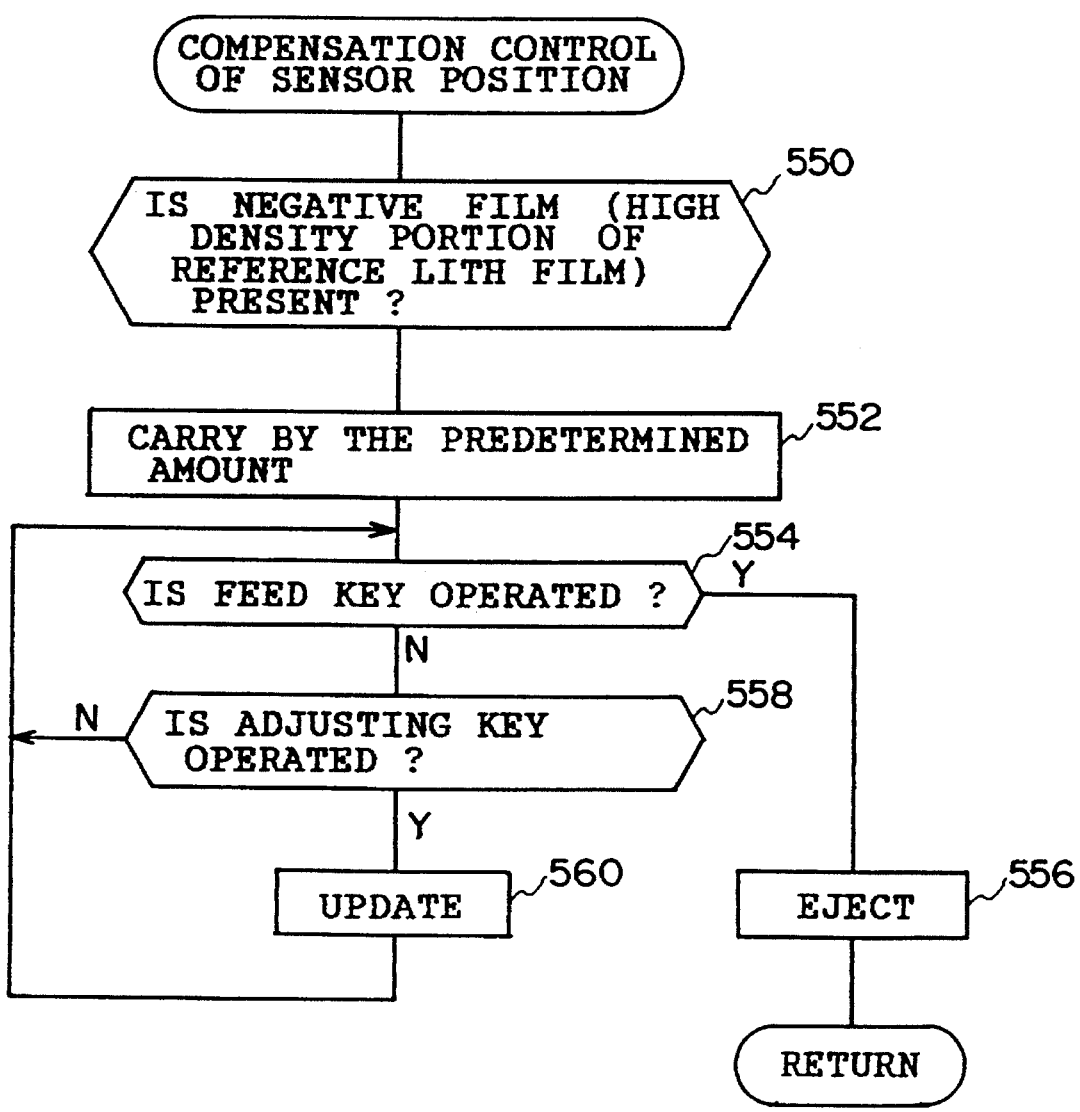
FIG. 15 is a control flowchart of compensation of mounting accuracy of a sensor.

Mounting position of each sensor (the image detecting sensor 264, the bar code sensor 282, the tape sensor 274, the negative film presence or absence sensor 276) is determined on the basis of one side (reference side) of the printing opening 206 at the printing position of the image frame. The respective distances between each sensor and the reference side are defined as the feed pulse number of the pulse motor 218. However, if the respective distances deviate when assembling the negative carrier 18, the respective distances are not identical with the predetermined pulse numbers. Hence, it is necessary to compensate the feed pulse number determined in the design stage, according to the mounting accuracy. Referring now to the flowchart of FIG. 15, a description will be given of the accuracy correction of the sensor mounting.

Though the position correction of each sensor is independently performed, the same process is provided for each sensor. Thus, as an example, the position correction of the negative film presence or absence sensor 276 will be described hereinafter. In Step 550, it is determined whether or not a reference lith film is detected. The reference lith film is a type of a film for photomechanical process, which has a high density (opaque) portion at the intermediate position of a low density (substantially transparent) portion and a clear edge. The reference lith film is substituted for the negative film 16.

The transparent portion is undetectable in the operation. When a boundary between the transparent portion and the high density portion is detected, the operation proceeds from Step 550 to Step 552 to carry the reference lith film by the predetermined amount. The predetermined amount is defined as a carrying amount to position the predetermined detecting point on the right side of the printing opening 206.

In Step 554, the operator detects whether or not the edge between high and low density sides corresponds to the right side of the printing opening after the reference lith film is carried by the predetermined amount. If they correspond with each other, a feed key is operated to eject the reference lith film. Operation of the feed key causes the operation to proceed from Step 554 to Step 556, and eject the reference lith film to end.

If the feed key is not operated, the operation proceeds from Step 554 to Step 558. In Step 558, it is determined whether or not a fine adjustment key are operated to finely adjust. If not, the operation is repeated between Step 554 and Step 558. In Step 558, if the fine adjustment keys 310B, 310C are operated, the reference lith film is slightly moved according to the key operation to position the edge between the high and low density sides on the right side of the printing opening 206.

After the fine adjustment in Step 558 (i.e, after one adjustment step), the operation proceeds to Step 560 to update the predetermined amount after the adjustment. The operation proceeds to Step 554.

The process as described hereinbefore is repeatedly operated until the edge between the high and low density sides is surely positioned on the right side of the printing opening 206 by carrying the reference lith film by the predetermined amount in Step 552. Thus, accuracy of the mounting position is completely compensated.

In other sensors, the operation can be performed as in the case of the operation procedure as described above simply by selecting which sensor is used to detect in Step 550. Therefore, the feeding amount can be stored for the accurate position in spite of errors when assembling the sensors. Thus, it is possible to facilitate a simple mounting operation, and improve the operation efficiency.

Meanwhile, if the four image detecting sensors 264 are not in parallel with the image frame edge, the image frame edge may be shifted to a considerable extent. However, if the above compensation is performed, the four image detecting sensors 264 are apparently disposed in parallel with the image frame edge. As a result, it is ensured to detect the image frame edge.

What is claimed is:

1. A method of positioning an image frame recorded on a photographic film at a predetermined position, said method comprising the steps of:

detecting an image frame edge depending on a quantity of transmitted light passing through the photographic film while the photographic film is being carried;

determining a film carrying amount, wherein for a normal image frame the edge of which has been detected in said detecting step, the film carrying amount is based on the detected image frame edge, and for a faulty image frame the edge of which has been undetected in said detecting step, the film carrying amount is based on a recording tendency, said recording tendency being obtained based on the image frame edges of the normal image frames preceding said positioning the image frame at the predetermined position by carrying the photographic film by the film carrying amount determined in said determining step, wherein said film carrying amount for the faulty image frame is the sum of an average of carrying directional lengths of the normal image frames preceding said faulty image frame and an average of intervals between said normal image frames.

2. A method of positioning an image frame according to claim 1, wherein said detecting step includes detecting the image frame edges at the respective right and left edges, and wherein said determining step includes determining the film carrying amount based on a more appropriate one of the right and left edges if the image frame has the detected right and left edges.

3. A method of positioning an image frame according to claim 1, wherein, when said film carrying amount of said faulty image frame can not be determined in said determining step, said film carrying amount is defined as the predetermined reference amount.

4. A method of positioning an image frame according to claim 1, wherein said film carrying amount for the faulty image frame is defined as the predetermined reference amount when there is not a normal image frame preceding said faulty image frame and when said faulty image frame is placed at a leading edge.

5. A method of positioning an image frame at a predetermined position to print each image frame recorded on a photographic film on a photographic paper, said method comprising the steps of:

measuring a quantity of transmitted light passing through the photographic film while the photographic film is being carried;

detecting an image frame edge and establishing an image frame size for each image frame in a transverse direction of the photographic film, based on the quantity of transmitted light measured for each image frame in said measuring step; and positioning the image frame at the predetermined position by carrying the photographic film by a film carrying amount determined based on the image frame edge detected in said detecting and establishing step when said image frame size established in said detecting and establishing step conforms to a predetermined size.

6. A method of positioning an image frame according to claim 5, wherein said image frame size is any one of a standard size and a panoramic size.

7. A method of positioning an image frame according to claim 5, wherein if the image frame size established in said detecting and establishing step is different from a predetermined size, said image frame is passed through the predetermined position.

8. A method of positioning an image frame according to claim 6, wherein in said measuring step said quantity of transmitted light is measured at a plurality of positions disposed along the transverse direction of the photographic film, and wherein said measuring step includes measuring said quantity of transmitted light at least one position disposed within the range of a standard size image frame in the transverse direction the photographic film and outside the range of a panoramic size image frame in the transverse direction of the photographic film.

9. A method of positioning an image frame according to claim 8, wherein if the quantity of transmitted light detected at said at least one position in said measuring step is substantially equal to that of transmitted light detected at a base of the photographic film, said image frame can be defined as the panoramic size image frame, and otherwise, said image frame being defined as the standard size image frame.

10. A method of positioning an image frame according to claim 5, wherein said detecting and establishing step includes detecting image frame edges at the respective right and left sides of the image frame, and wherein said film carrying amount is determined based on a more appropriate one of the right and left edges in said frame edges detected at the respective right and left sides of said image frame.

11. A method of positioning an image frame according to claim 5, wherein if said image frame is a faulty image frame which has an image frame edge undetected in said detecting and establishing step, said film carrying amount is determined based on a recording tendency of a normal image frames preceding said faulty image frame, said normal image frame having the image frame edge detected in said detecting and establishing step.

12. A method of positioning an image frame according to claim 11, wherein said film carrying amount is determined based on both carrying directional lengths of said normal image frames preceding said faulty image frame and intervals between said normal image frames.

13. A method of positioning an image frame according to claim 12, wherein said film carrying amount is the sum of an average of the carrying directional lengths of the normal image frames preceding said faulty image frame and an average of intervals between said normal image frames.

14. A method of positioning an image frame according to claim 11, wherein said film carrying amount is defined as the predetermined reference amount when there is not any normal image frame preceding said faulty image frame and when said faulty image frame is placed at a leading edge.

15. A photographic film carrier used in conjunction with a photoprinter for printing image frames consecutively recorded on a photographic film on a photographic paper, and used for carrying the photographic film to position each image frame at a printing position in order, said photographic film carrier comprising:

a base having a printing opening for exposing light provided at said printing position, and having a guide path for guiding said photographic film;

a switching means for enabling a mask for a standard size image frame and for a panoramic size image frame to be switched over from one to another;

a measuring means disposed upstream of said printing opening for measuring a quantity of transmitted light passing through the photographic film carried on said guide path, said measuring means comprising a plurality of sensors disposed along the photographic film transverse direction, and at least one of said sensors disposed within the range of the standard size image frame in the photographic film transverse direction and outside the range of the panoramic size image frame in the photographic film transverse direction;

an image frame detecting means for detecting an image frame edge depending on said quantity of transmitted light measured by said measuring means;

an establishing means for establishing the size of the image frame for each image frame depending on said quantity of transmitted light measured by said at least one of the sensors for each image frame; and a positioning means for positioning the image frame at the printing position depending on the image frame edge detected by the image frame detecting means when the size of said image frame, established by said establishing means, is that of the image frame mask on the printing opening.

16. A photographic film carrier according to claim 15, wherein if the quantity of transmitted light detected by said at least one sensor is substantially equal to that of transmitted light detected at a base of the photographic film, an image frame can be defined as a panoramic size image frame by said establishing means, and otherwise, said image frame being defined as a standard size image frame.

17. A photographic film carrier according to claim 15, wherein said image frame detecting means detects the image frame edges in the respective right and left sides of said image frame, and wherein said positioning means carries the film by a film carrying amount determined depending on a more appropriate frame edge of the frame edges which are detected in the respective right and left sides of said image frame to position said image frame at said printing position.

18. A photographic film carrier according to claim 17, wherein, if said image frame is a faulty image frame which has an image frame edge undetected by said image frame detecting means at the respective right and left edges of the image frame, said positioning means carries a film by a film carrying amount obtained based on a recording tendency of normal image frames preceding said faulty image frame, said normal image frame having the image frame edge detected by said image frame detecting means, thereby positioning said image frame at said printing position.

19. A photographic film carrier according to claim 18, wherein said film carrying amount is determined based on both carrying directional lengths of normal image frames preceding said faulty image frame and intervals between said normal image frames.

20. A photographic film carrier according to claim 19, wherein said film carrying amount is the sum of an average of carrying directional lengths of the normal image frames preceding said faulty image frame and an average of intervals between said normal image frames.

21. A photographic film carrier according to claim 20, wherein said film carrying amount is defined as the predetermined reference amount when said faulty image frame is placed at a leading edge and when there is not any normal image frame preceding said faulty image frame.

* * * * *

UNITED STATES PATENT AND TRADEMARK OFFICE
CERTIFICATE OF CORRECTION

PATENT NO. : 5,555,181
DATED : September 10, 1996
INVENTOR(S) : Yasuhiro Seto

It is certified that error appears in the above-indentified patent and that said Letters Patent is hereby corrected as shown below:

Col. 16, line 5, delete "(N-1)" and insert --N--;

Col. 16, line 5, delete "preceding Step" and insert --previous routine step 422--.

Col. 16, line 6, delete "(N-1)" and insert --N--.

Col. 16, line 7, delete "present Step" and insert --present routine step 422--.

Col. 16, line 11 delete "(N-1)" and insert --N--.

Signed and Sealed this

Fourteenth Day of January, 1997

Attest:

BRUCE LEHMAN

*Attesting Officer*     *Commissioner of Patents and Trademarks*